(12) United States Patent
Hamano et al.

(10) Patent No.: US 8,331,979 B2
(45) Date of Patent: Dec. 11, 2012

(54) ACCESS NETWORK SELECTION METHOD

(75) Inventors: Yuichiro Hamano, Kawasaki (JP);
Shinichiro Aikawa, Kawasaki (JP);
Akishige Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/531,041

(22) Filed: Jun. 22, 2012

(65) Prior Publication Data

US 2012/0263114 A1    Oct. 18, 2012

Related U.S. Application Data

(63) Continuation of application No. 12/078,053, filed on Mar. 26, 2008, now Pat. No. 8,238,964, which is a continuation of application No. PCT/JP2006/306175, filed on Mar. 27, 2006.

(30) Foreign Application Priority Data

Oct. 14, 2005 (WO) .................. PCT/JP2005/018921

(51) Int. Cl.
*H04Q 7/20* (2006.01)
(52) U.S. Cl. ............... 455/552.1; 455/422.1; 455/426.1; 370/236; 370/235; 370/252; 370/351; 370/329; 709/230; 709/239; 709/201; 709/202; 709/223
(58) Field of Classification Search ............... 455/552.1, 455/422.1, 426.1
See application file for complete search history.

(56) References Cited

U.S. PATENT DOCUMENTS

| | | | |
|---|---|---|---|
| 6,591,103 B1 | 7/2003 | Dunn et al. | |
| 7,020,087 B2 | 3/2006 | Steinberg et al. | |
| 7,099,277 B2 * | 8/2006 | Sahinoglu et al. | 370/238 |
| 7,295,568 B2 * | 11/2007 | Kossi et al. | 370/432 |
| 7,542,481 B2 | 6/2009 | Faccin et al. | |
| 2001/0009853 A1 | 7/2001 | Arimitsu | |
| 2003/0035401 A1 | 2/2003 | Shaheen et al. | |

(Continued)

FOREIGN PATENT DOCUMENTS

JP    2001008251    1/2001

(Continued)

OTHER PUBLICATIONS

International Search Report PCT/JP2006/306175 dated Jun. 13, 2006.

(Continued)

*Primary Examiner* — Jinsong Hu
*Assistant Examiner* — Jean Chang
(74) *Attorney, Agent, or Firm* — Murphy & King, P.C.

(57) ABSTRACT

An access network selection method in a communications network having access networks is disclosed that includes notifying devices in calling-side and called-side networks of the identifiers of currently available access networks and user preferences; making a list of candidates for an access network to be assigned to the called-side terminal, and transmitting the list to the device in the calling-side network; determining an access network to be assigned to the calling-side terminal in response to reception of the list, and notifying the calling-side terminal of the determined access network; notifying the device in the called-side network of the type of the access network assigned to the calling-side terminal; and determining the access network to be assigned to the called-side terminal in response to reception of the signal of the type of the access network assigned to the calling-side terminal, and notifying the called-side terminal of the determined access network.

5 Claims, 32 Drawing Sheets

U.S. PATENT DOCUMENTS

| | | | |
|---|---|---|---|
| 2003/0137942 A1 | 7/2003 | Ladegaard | |
| 2004/0136324 A1* | 7/2004 | Steinberg et al. | 370/238 |
| 2004/0192301 A1 | 9/2004 | Shi | |
| 2004/0218605 A1 | 11/2004 | Gustafsson et al. | |
| 2004/0248574 A1 | 12/2004 | Watanabe et al. | |
| 2005/0227692 A1 | 10/2005 | Kawashima et al. | |
| 2006/0168275 A1* | 7/2006 | Lin et al. | 709/230 |
| 2008/0130558 A1* | 6/2008 | Lee et al. | 370/329 |
| 2008/0298313 A1 | 12/2008 | Salminen | |
| 2012/0149366 A1* | 6/2012 | Mariblanca Nieves et al. | 455/426.1 |

FOREIGN PATENT DOCUMENTS

| | | |
|---|---|---|
| JP | 2001197538 | 7/2001 |
| JP | 2003333639 | 11/2003 |
| JP | 2004336384 | 11/2004 |
| JP | 2005110262 | 4/2005 |
| JP | 2005203926 | 7/2005 |
| JP | 2005277815 A | 10/2005 |
| WO | 0232179 A1 | 4/2002 |
| WO | 2004014098 A1 | 2/2004 |

OTHER PUBLICATIONS

Extended European Search Report dated Dec. 1, 2011 received in Application No. 06730123.4-1249/1944917.

Japanese Office Action dated May 11, 2010 received in corresponding Japanese Patent No. 2007-539810.

KR Office Action issued in KR 10-2008-7008937 dated Nov. 23, 2009.

3GPP TS 23.122 V6.5.0 (Jun. 2005); 3rd Generation Partnership Project; Technical Specification Group Core Network and Terminals; Non-Access-Stratum (NAS) functions related to Mobile Station (MS) in idle mode; 34 pages.

Bin Wang, Xu Su, C.L. Philip Chen A New Bandwidth Guaranteed Routing Algorithm for MPLS Traffic Engineering, 2002 pp. 1001-1005.

Kalle Ahmavaara, Henry Haverinen; and Roman Pichna, Nokia Corporation, Finland; Interworking Architecture Between 3GPP and WLAN Systems 2003-11, pp. 74-81.

Non-Final Office Action dated Oct. 17, 2011 received in U.S. Appl. No. 12/078,053.

Notice of Allowance dated Apr. 27, 2012 received in U.S. Appl. No. 12/078,053.

* cited by examiner

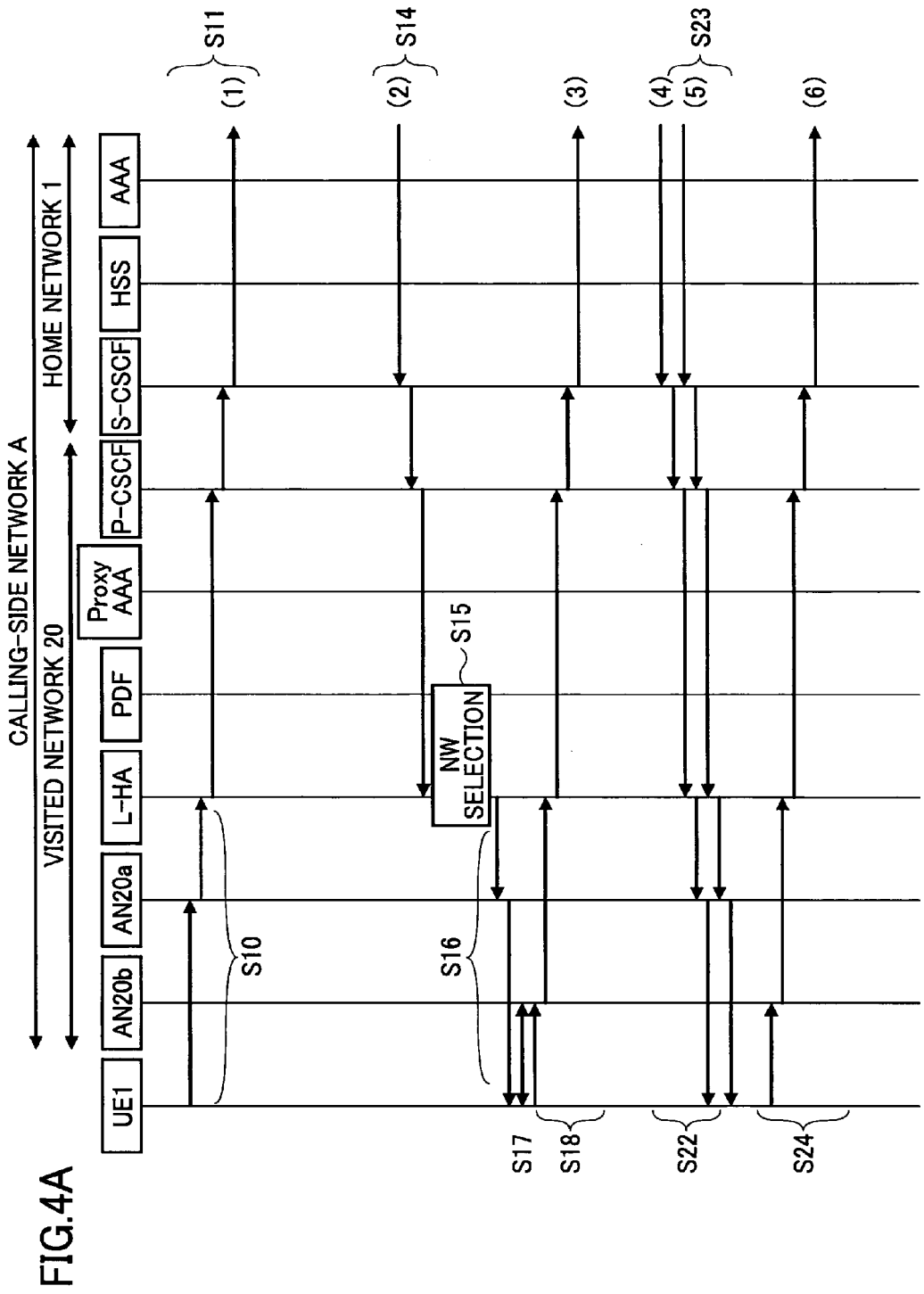

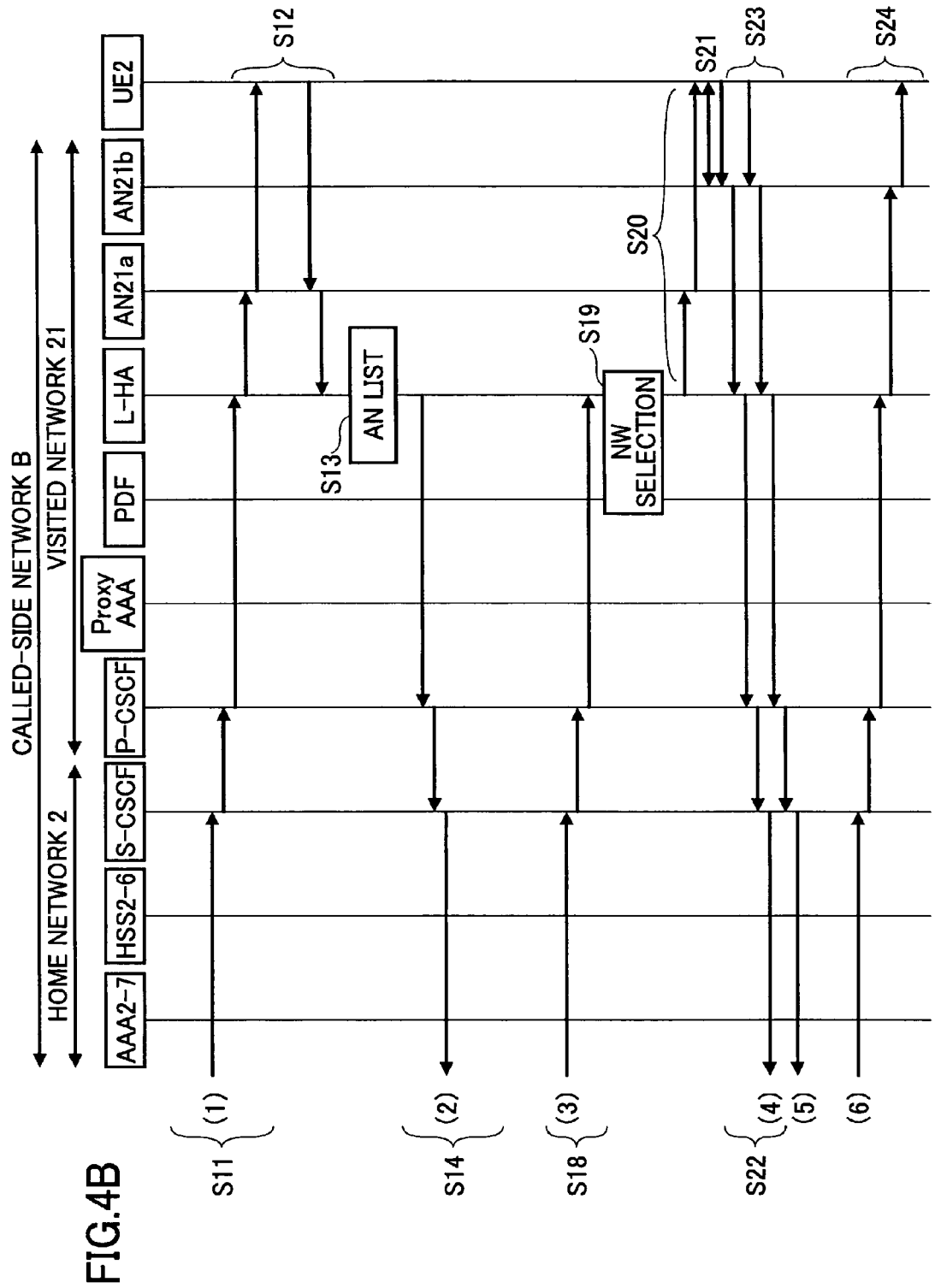

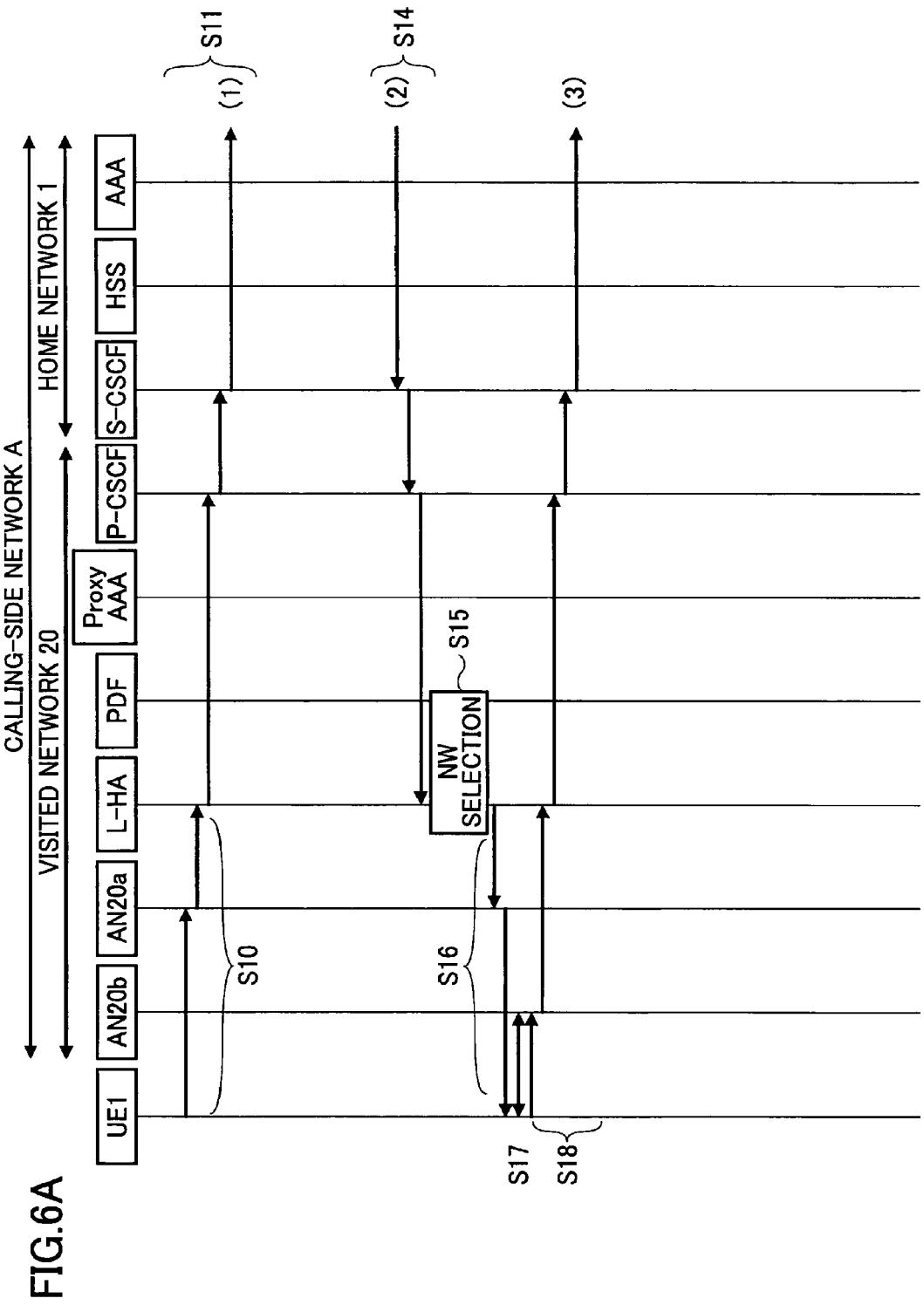

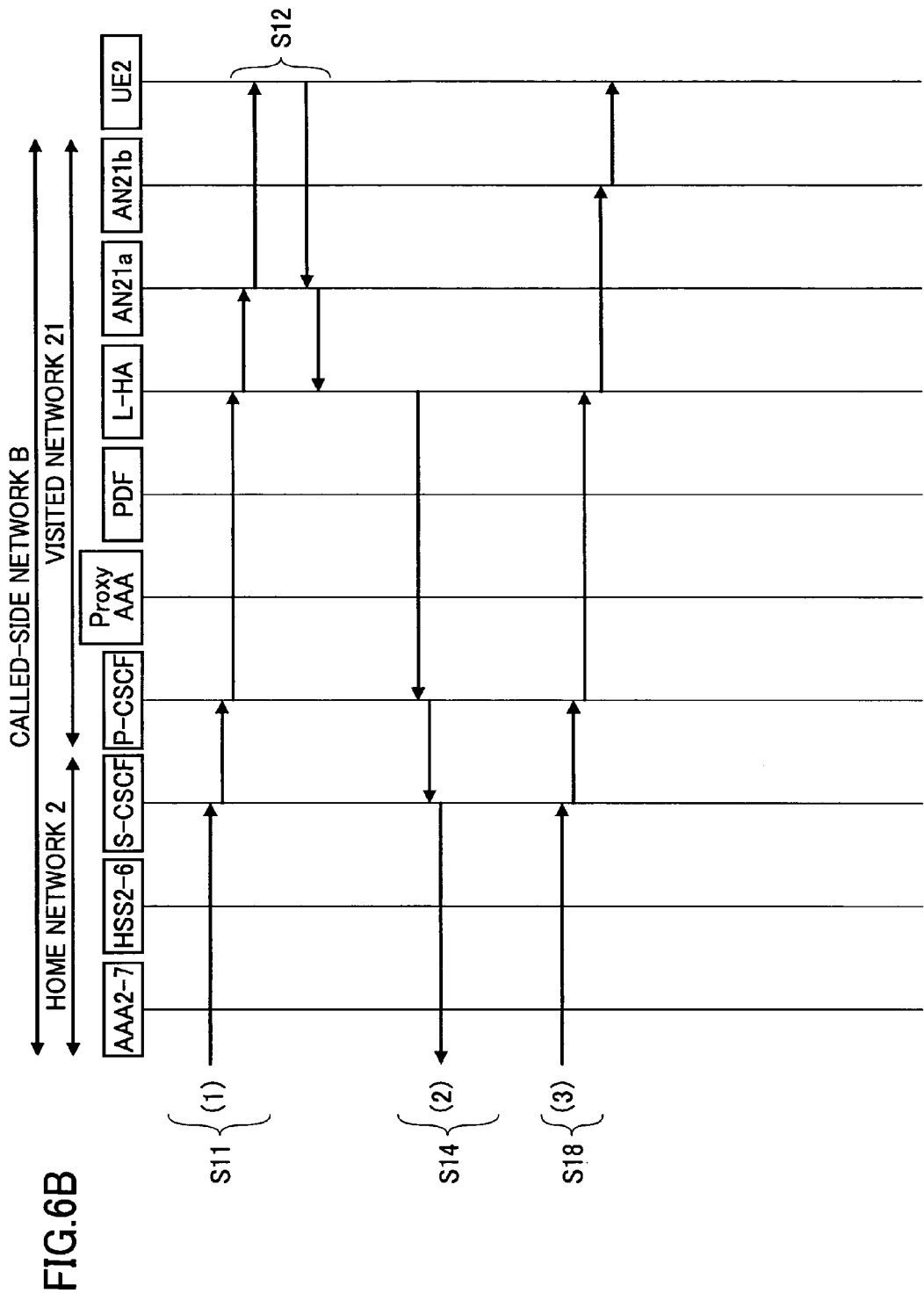

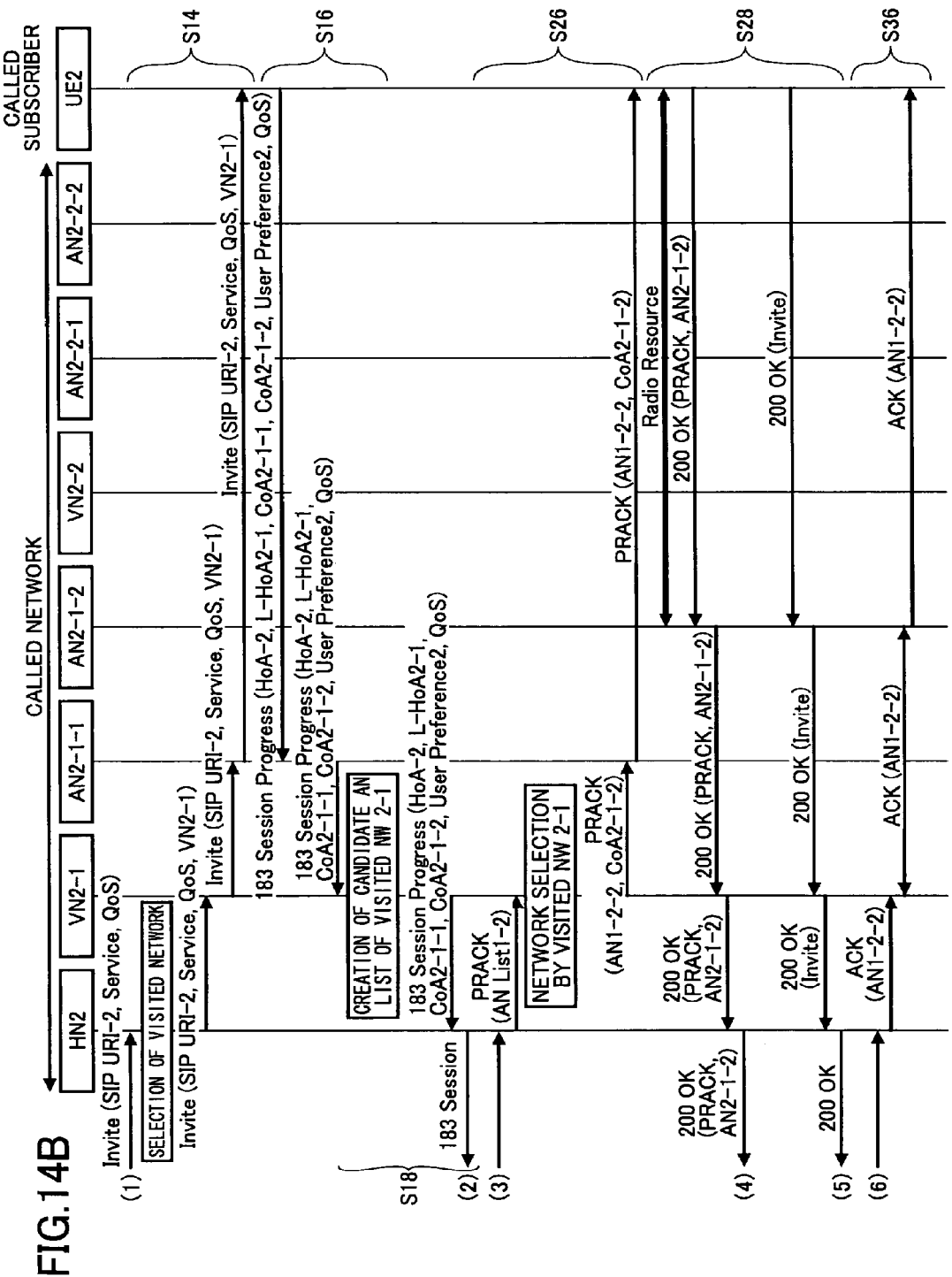

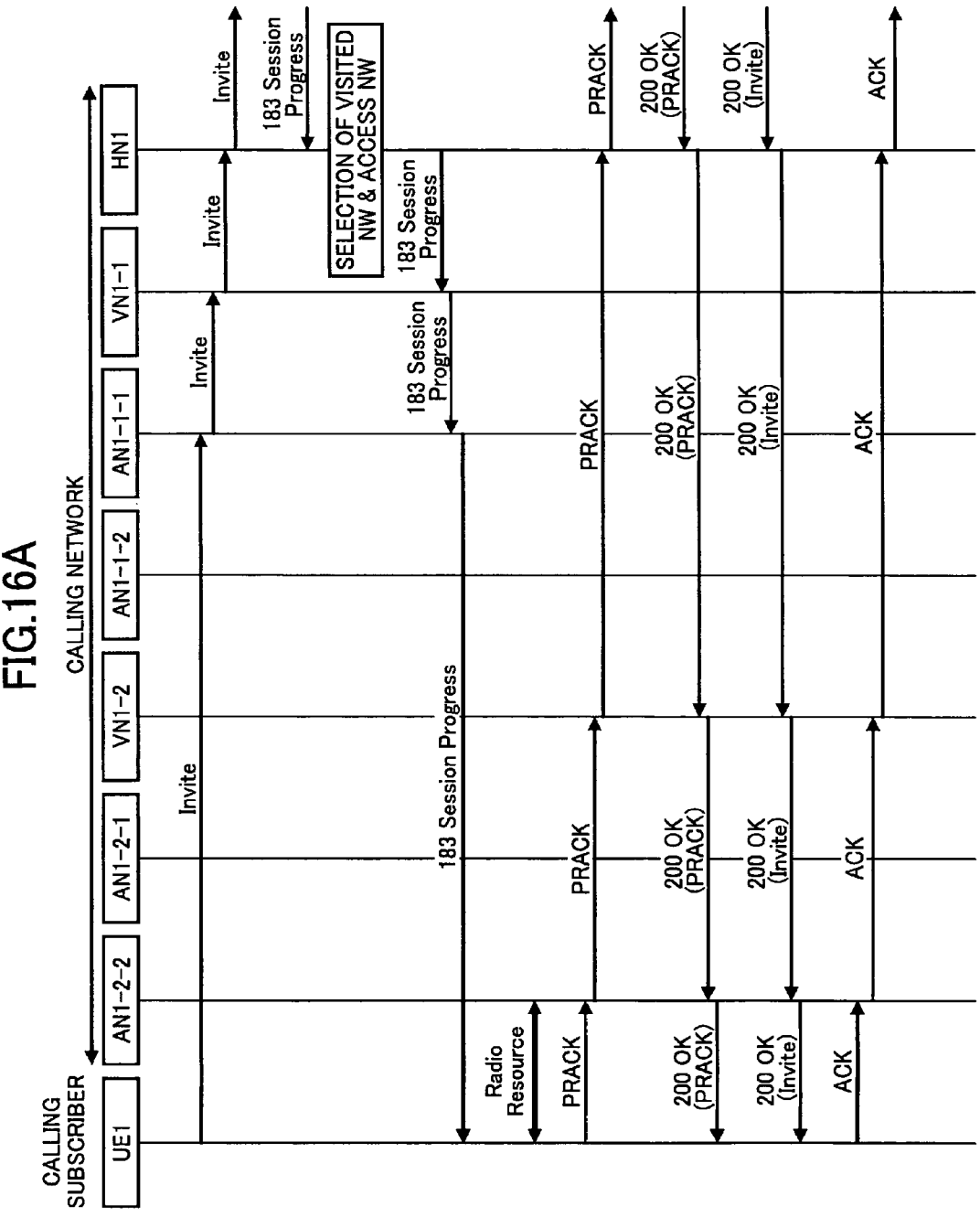

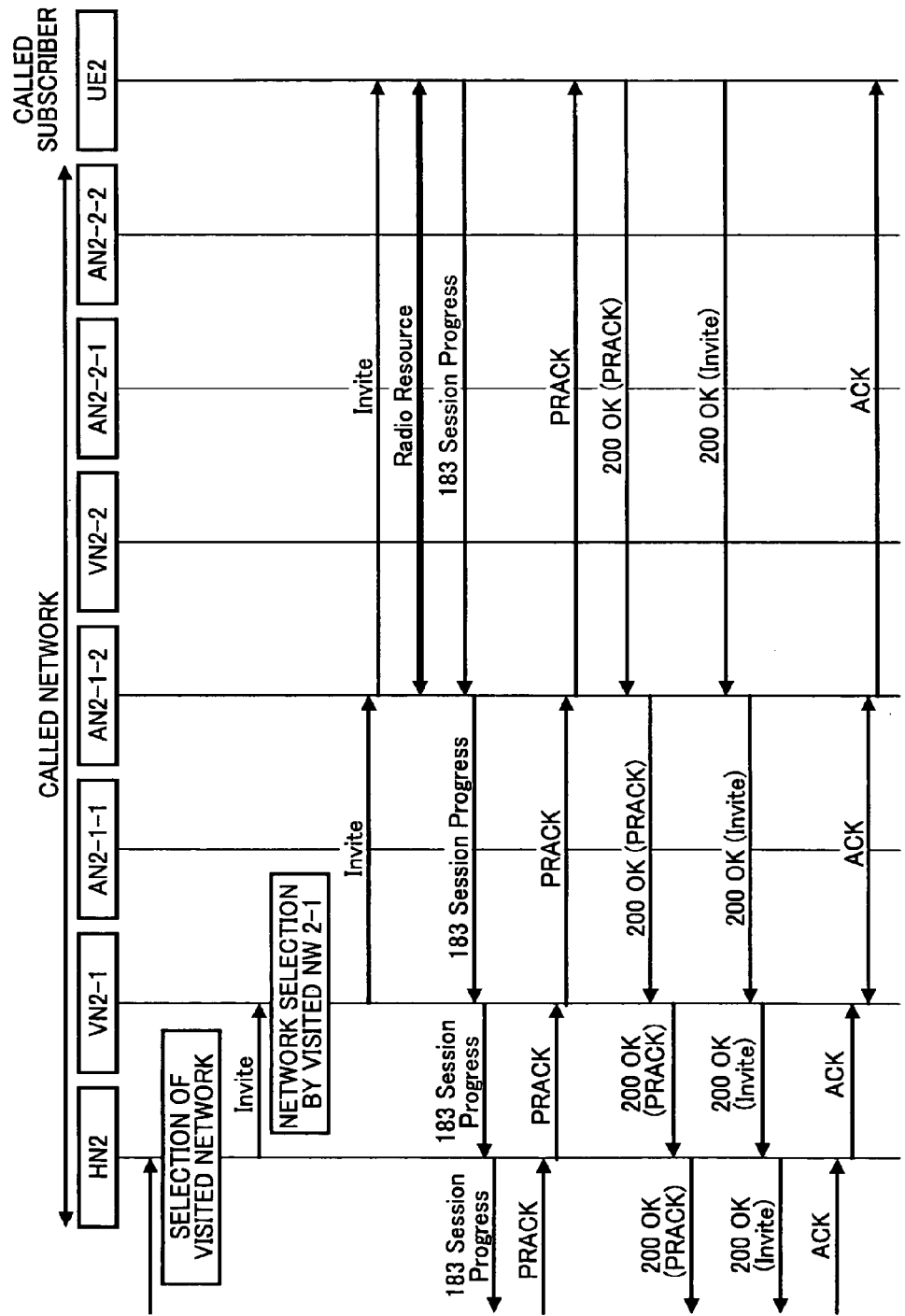

ACCESS NETWORK SELECTION METHOD

CROSS-REFERENCE TO RELATED APPLICATION

The present application is a continuation of U.S. patent application Ser. No. 12/078,053, filed Mar. 26, 2008, now U.S. Pat. No 8,238,964, which is a continuation application filed under 35 U.S.C. 111(a) claiming benefit under 35 U.S.C. 120 and 365(c) of PCT International Application No. PCT/JP2006/306175, filed on Mar. 27, 2006, which claims priority to PCT International Application No. PCT/JP2005/018921, filed on Oct. 14, 2005. The entire contents of the foregoing applications are hereby incorporated by reference.

BACKGROUND OF THE INVENTION

1. Field of the Invention

The present invention relates to a method of selecting an access network in accordance with a service provided, a user preference, or an operator policy in a communications network where multiple access networks are available.

2. Description of the Related Art

3GPP (Third Generation Partnership Protocol) technical specifications TS 23.122 v6.5.0 (2005.06) define a method of performing location registration through selection of an optimum network from combinations of operators' networks and access networks by a user or terminal.

According to the specifications, however, communications are always performed through the network on which the location registration has been performed, irrespective of the type of a service that the user wishes to use (for example, voice communications, data reception, etc.). Therefore, there is a problem in that even if there is another optimum network for the service that the user (terminal) wishes to use and the location of the user allows the user to use the network, the user can only use the network on which the user has performed location registration.

Further, there is also a problem in that the availability of resources on the network side, an operator policy, and the type of a network selected by a correspondent, which should be determined at the start of the communications, are not taken into consideration in selecting a network because the network selection is performed at the time of location registration by the terminal alone.

As the same idea as described above, Patent Document 1 discloses a method of determining which access network to connect to in a location where multiple access means (W-CDMA and WLAN, etc.) are available. However, the method described in Patent Document 1 also shows that a terminal selects an optimum one from multiple access networks, thus having the same problems as the above-described technical specifications TS 23.122.

On the other hand, Patent Document 2 proposes a method of selecting an optimum access network based on the resource information of each of multiple access networks by a common radio resource manager in a network. However, this proposal has a problem in that while the resource conditions of the access networks and an operator preference are considered, the preference of a user or terminal or the result of selection of an access network by a correspondent is not considered.

Further, Patent Document 3 discloses a method of performing handover from an access network to another access network at a location where multiple access means (W-CDMA and WLAN, etc.) are available at the time of handover. This method disclosed in Patent Document 3 shows that a terminal selects an optimum one from multiple access networks, and the location and moving speed of the terminal itself, cost, network QoS (Quality of Service) information, battery consumption, etc., are cited as information for the terminal selecting an access network. However, this method also has the same problem as described above in that the result of selection of an access network in the case of handover by a correspondent is not considered.

In 3GPP, TS 25.401 v6.6.0 (2005.06) defines handover within the access networks of the same type (within GERANs and within UTRANs) and between different access networks (between GERAN and UTRAN). Whether to perform this handover is determined by the access network based on the information of which the access network is notified by the terminal, such as the intensity of the radio wave received by the terminal. Accordingly, a core network does not intervene in this determination, so that there is a problem in that the QoS of the entire network, an operator policy, or the type of the access network used by a correspondent is not considered.

[Patent Document 1] Japanese Laid-Open Patent Application No. 2005-110262

[Patent Document 2] Japanese Translation of PCT International Application No. 2004-511988

[Patent Document 3] Japanese Laid-Open Patent Application No. 2003-333639

As described above, conventionally, the access network used to perform communications is fixed to the access network selected by a terminal or used at the time of location registration even if multiple access networks are available.

Further, in the case of selecting an optimum access network in accordance with the resource conditions of each access network, the access network is selected based only on the information detectable by the terminal (user) (such as the availability of the resources of a radio section). Therefore, a user preference such as which network the user wishes to use or the result of selection of an access network by a correspondent is not considered, so that there is a problem in that an optimum access network is not necessarily selected from the viewpoint of the entire communication-related path.

SUMMARY OF THE INVENTION

Embodiments of the present invention may solve or reduce one or more of the above-described problems.

According to one embodiment of the present invention, there is provided an access network selection method in which one or more of the above-described problems may be solved or reduced.

According to one embodiment of the present invention, there are provided a method that makes it possible to select an optimum access network from the viewpoint of the entire communication-related path by defining the procedure for the optimum access network providing information for the selection, and a network system using the same.

According to one embodiment of the present invention, there is provided an access network selection method in a communications network having multiple access networks, including the steps of: notifying a device in a calling-side network of an identifier corresponding to a currently available access network and a user preference from a calling-side terminal making a call originating request; notifying a device in a called-side network of an identifier corresponding to a currently available access network and a user preference from a called-side terminal having received the call originating request via the device in the calling-side network; making a list of candidates for an access network to be assigned to the called-side terminal based on a predetermined condition in response to reception of a notification signal from the called-side terminal as a trigger, and transmitting the list from the device in the called-side network to the device in the calling-side network; determining an access network to be assigned to the calling-side terminal in response to reception of the list of the candidates for the access network to be assigned from the device in the called-side network as a trigger, and notifying the calling-side terminal of the determined access network by the device in the calling-side network; notifying the device in the called-side network of a type of the access network assigned to the calling-side terminal by one of the calling-side terminal and the device in the calling-side network; and determining the access network to be assigned to the called-side terminal based on a condition based on which the access network to be assigned to the calling-side terminal has been determined in the device in the calling-side terminal, in response to reception of a signal of the type of the access network assigned to the calling-side terminal as a trigger, and notifying the called-side terminal of the determined access network by the device in the called-side network.

According to one embodiment of the present invention, there is provided an access network selection method in a communications network having multiple access networks, including the steps of: notifying a device in a calling-side network of an identifier corresponding to a currently available access network and a user preference from a calling-side terminal making a call originating request; transmitting a provisional response signal to the call originating request, from a called-side terminal having received the call originating request via the device in the calling-side network; and determining an access network to be assigned to the calling-side terminal in response to reception of the provisional response signal from the called-side terminal as a trigger, and notifying the calling-side terminal of the determined access network by the device in the calling-side network.

According to one embodiment of the present invention, there is provided an access network selection method in a communications network having multiple access networks, including the steps of: notifying a device in a calling-side network of an identifier corresponding to a currently available access network and a user preference from a calling-side terminal making a call originating request; transmitting a response signal to the call originating request, from a called-side terminal having received the call originating request via the device in the calling-side network; and determining an access network to be assigned to the calling-side terminal in response to reception of the response signal from the called-side terminal as a trigger, and notifying the calling-side terminal of the determined access network by the device in the calling-side network.

According to one aspect of the present invention, it is possible to select an optimum access network from the viewpoint of the entire communication-related path by defining the procedure for the optimum access network providing information for the selection.

BRIEF DESCRIPTION OF THE DRAWINGS

Other objects, features and advantages of the present invention will become more apparent from the following detailed description when read in conjunction with the accompanying drawings, in which:

FIG. 4A is a diagram showing an operational sequence on the mobile communications terminal UE1 side at the start of communications in the case where the mobile communications terminal UE1 makes a request for communications to the mobile communications terminal UE2;

FIG. 4B is a diagram showing an operational sequence on the mobile communications terminal UE2 side at the start of communications in the case where the mobile communications terminal UE1 makes a request for communications to the mobile communications terminal UE2;

FIG. 6A is a diagram showing an operational sequence on the mobile communications terminal UE1 side at the start of communications in the case where the mobile communications terminal UE2 that is a called-side terminal directly returns a response signal (OK) without a provisional response signal (Session Progress);

FIG. 6B is a diagram showing an operational sequence on the mobile communications terminal UE2 side at the start of communications in the case where the mobile communications terminal UE2 that is a called-side terminal directly returns a response signal (OK) without a provisional response signal (Session Progress);

FIG. 14B shows a called-side sequence diagram in the case where a home network HN statically selects only a visited network VN and the visited network VN dynamically selects an access network AN;

FIG. 16A shows a calling-side sequence diagram in the case where a home network HN statically selects a visited network VN and an access network AN;

FIG. 18B show a called-side sequence diagram in the case where a home network HN statically selects only a visited network VN and the visited network VN statically selects an access network AN;

DETAILED DESCRIPTION OF THE PREFERRED EMBODIMENTS

A description is given, with reference to the accompanying drawings, of embodiments of the present invention.

According to one aspect of the present invention, it is possible for a terminal to notify a device in the network of the type of an available access network and a user preference and it is possible for the device in the network to select an access network at the time of originating a call and the time of receiving a call, taking into account, in addition to these information items, a user-requested service or application, the resource conditions in the wired network or a radio section, an operator policy, etc.

Further, if both calling network side and called network side have the above-described network selecting function, by newly providing a procedure for devices in the network notifying each other of candidates for an access network to be selected or a selected access network, it is possible to select an access network in the network in accordance with the candidates for the access network to be selected or the selected access network in the network where the correspondent exists.

Further, it is made possible to reselect an access network and perform handover when an available access system changes with a movement of a terminal after the start of communications or when there is a change of the service or application requested by a user or the resource conditions of a radio section.

Further, notifying a correspondent of the type of the selected access network after completion of the above-described handover makes it possible for the notified correspondent to reselect its own access network in response to the change of the access network in the notifying network where the correspondent exists as a trigger.

According to one aspect of the present invention, it is possible to implement the function of selecting an optimum access network at the time of originating and receiving a call and during communication without fixation to the result of selection at the time of location registration based on various conditions as well as a user preference in a communications network having multiple access networks.

[Embodiment 1]

Shown below is an embodiment of the present invention in the case of applying SIP (Session Initiation Protocol), which is a communications control protocol used in IP telephony, as a protocol in a mobile communications network.

Figure 1:
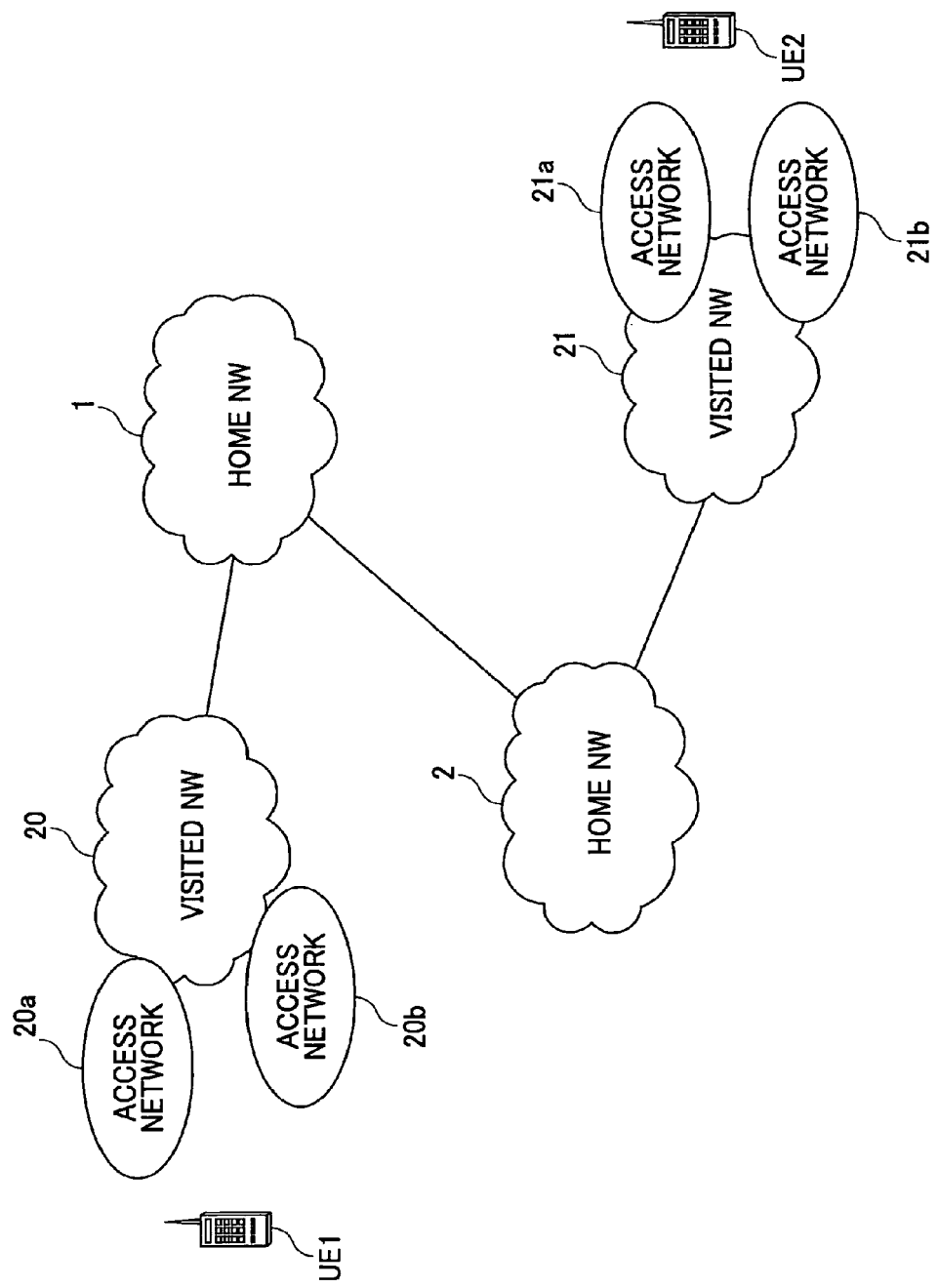
FIG. 1 is a configuration diagram of a mobile communications network that implements the present invention.

FIG. 1 is a configuration diagram of a mobile communications network that implements the present invention. User equipment UE1 and user equipment UE2, which are mobile communications terminals that actually perform communications in the present invention, are assigned home addresses (HoAs) HoA1 and HoA2 by home networks (HNs) 1 and 2 to which they subscribe, respectively.

The home network HN1 and the home network HN2 are mobile communications networks to which the mobile communications terminals UE1 and UE2 subscribe, respectively. Further, visited networks (VNs) 20 and 21 are networks where the mobile communications terminals UE1 and UE2 exist, respectively. Further, access networks 20a and 20b are access means provided to the mobile communications terminal UE1 by the visited network VN 20, and access networks 21a and 21b are access means provided to the mobile communications terminal UE2 by the visited network VN 21.

Figure 2A:
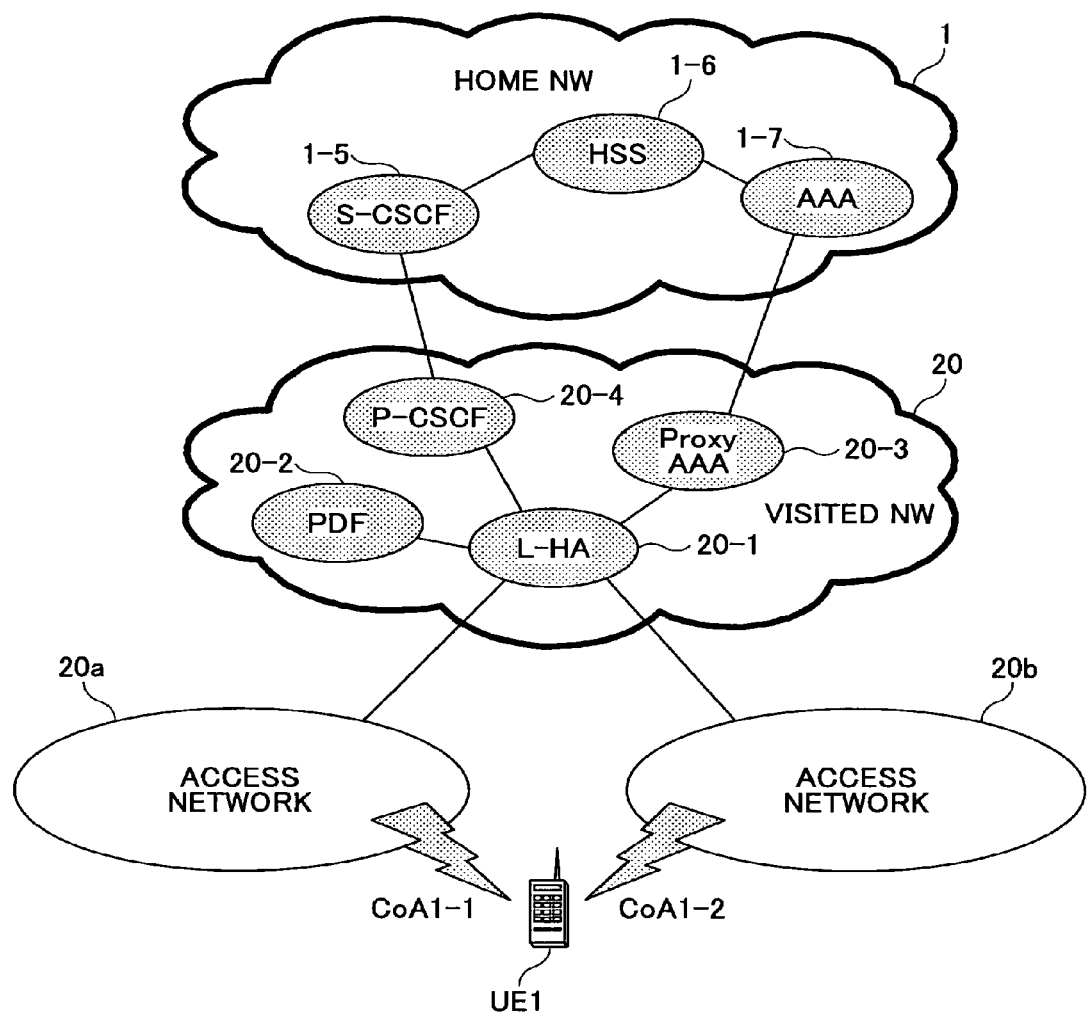
FIG. 2A is a diagram showing a configuration corresponding to a mobile communications terminal UE1 in a disposition of functions for implementing the present invention.
Figure 2B:
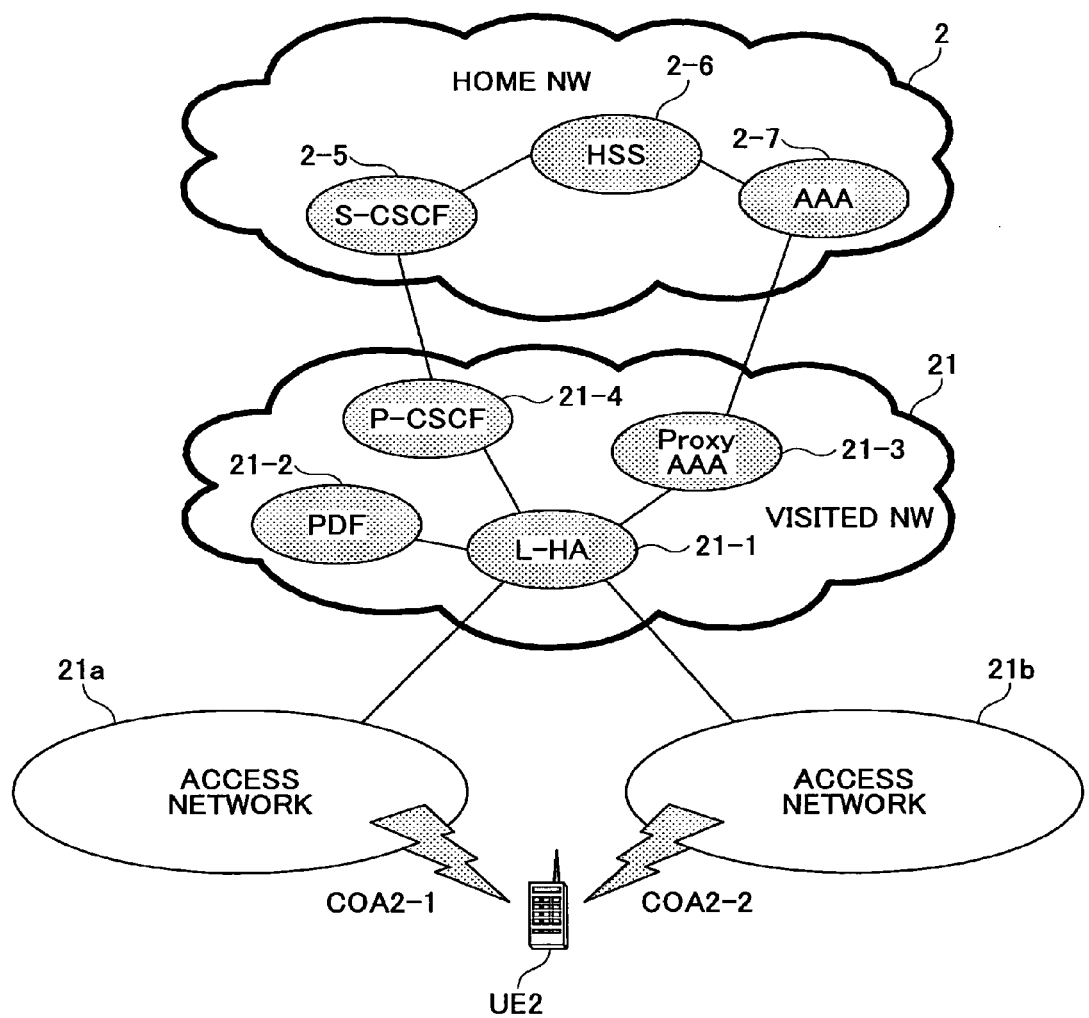
FIG. 2B is a diagram showing a function disposition configuration corresponding to a mobile communications terminal UE2 in the disposition of functions for implementing the present invention.

FIG. 2A shows a function configuration corresponding to the mobile communications terminal UE1 in a disposition of functions for implementing the present invention. FIG. 2B is a diagram showing a function disposition configuration corresponding to the correspondent mobile communications terminal UE2.

A description is given below of FIG. 2A, while it is the same with FIG. 2B about the mobile communications terminal UE2. Accordingly, a description of FIG. 2B is omitted as it is thought proper.

In FIG. 2A and FIG. 2B, characteristic are function parts as local home agents (L-HAs) 1-1 and 2-1 provided by the present invention.

That is, the local home agents (L-HAs) 1-1 and 1-2 are function parts newly provided to implement the present invention, and have the function of assigning local home addresses (L-HoA1 and L-HoA2) to the mobile communications terminals UE1 and UE2 that move in a service provision area and the function of selecting an optimum access network at the start of communications based on the type of an available access network and a user profile transmitted from the mobile communications terminals UE1 and UE2, QoS (Quality of Service), and an operator policy.

The mobile communications terminals UE1 and UE2 have the function of performing communications based on multiple radio systems, and have the function of being assigned a care-of address (CoA) for each corresponding radio system and a local home address (L-HoA1, L-HoA2) in the visited network (VN) 20, 21 and storing them.

Further, the mobile communications terminals UE1 and UE2 have the function of notifying the local home agents (L-HAs) 20-1 and 21-1, at the time of requesting to originate a call and at the time of responding to a received call, of a care-of address (CoA) corresponding to an available radio system (access network) at that time, a user preference, and the local home address (L-HoA).

The procedure for acquiring a local home address (L-HoA) and a care-of address (CoA) and performing registration with an S-CSCF (Serving Call Session Control Function) 1-5 in the home network HN 1 by the mobile communications terminal UE1 is shown below and in FIG. 3.

When the mobile communications terminal UE1 moves in the service provision area of the visited network VN 20, the mobile communications terminal UE1 acquires care-of addresses CoA1-1 and CoA1-2 from the access networks 20a and 20b, respectively, upon receiving their radio waves for the first time (step S1).

The mobile communications terminal UE1 registers the home address HoA1, assigned from the home network HN 1 and serving as an identifier, and the care-of address CoA1-1, assigned from the access network 20a, with the local home agent (L-HA) 20-1 via the access network 20a (step S2).

When the local home agent 20-1 accepts the registration from the mobile communications terminal UE1, the local home agent 20-1 refers to a table that it retains, and determines whether the local home address L-HoA1 corresponding to the home address HoA1 has been assigned.

If no local home address L-HoA has been assigned, the local home agent 20-1 assigns the local home address L-HoA1 to the mobile communications terminal UE1, includes it in a response to the registration, and transmits it to the mobile communications terminal UE1 (step S3). At the same time, the local home agent (L-HA) 20-1 correlates the home address HoA1 with the local home address L-HoA1 and the care-of address CoA1-1 and stores them (step S4).

The mobile communications terminal UE1 registers the home address HoA1 and the care-of address CoA1-2 with the local home agent L-HA 20-1 via the access network 20b in the same procedure (step S5).

Since the local home agent L-HA 20-1 has already assigned the local home address L-HoA1 to the mobile communications terminal UE1, the local home agent L-HA 20-1 makes only a response of registration completion to the mobile communications terminal UE1 (step S6). At the same time, the local home agent (L-HA) 20-1 correlates the home address HoA1 with the care-of address CoA1-2 and stores them (step S7).

Upon completion of registration of all the acquired care-of addresses CoAs with the local home agent L-HA 20-1 and acquisition of the local home address L-HoA1, the mobile communications terminal UE1 registers the local home address L-HoA1 with the S-CSCF 1-5 in the home network HN 1 to which it subscribes (step S8).

By the above-described procedure, acquisition of the local home address L-HoA and the care-of address CoA and registration with the S-CSCF (Serving Call Session Control Function) 1-5 by the mobile communications terminal UE are completed.

Next, an operational sequence at the start of communications in the case where the mobile communications terminal UE1 makes a request for communications to the mobile communications terminal UE2 as an embodiment is shown in FIG. 4A and FIG. 4B. FIG. 4A shows processing from the mobile communications terminal UE1 side, and FIG. 4B shows processing from the mobile communications terminal UE2 side. In this embodiment, the mobile communications terminal and the network have a network selecting function on both calling and called sides.

In FIG. 4A and FIG. 4B, the mobile communications terminal UE1 includes the local home address L-HoA1 and the care-of addresses CoA1-1 and CoA1-2, which are identifiers, and a user preference 1 in a signal of a request to originate a call (Invite), and transmits it to the local home agent L-HA 20-1 via the access network 20a (step S10).

Here, the local home address L-HoA is used for the local home agent L-HA to determine which mobile communications terminal UE the communications request is from, and the care-of addresses CoA1-1 and CoA1-2 are used for the mobile communications terminal UE1 to notify the local home agent L-HA1 of the type of an available access network.

Further, the user preference 1 is information for notifying the local home agent L-HA 20-1 on what basis the user of the mobile communications terminal UE1 wishes to have network selection performed (for example, with priority on communications speed, priority on communications cost, etc.).

Receiving the call originating request signal (Invite) from the mobile communications terminal UE1, the local home agent L-HA 20-1 stores therein the local home address L-HoA1, the care-of addresses CoA1-1 and CoA1-2, and the user preference 1 transmitted from the mobile communications terminal UE1, and issues a call originating request signal to the mobile communications terminal UE2 (step S11).

In FIG. 4B, receiving the call originating request signal (Invite), the mobile communications terminal UE2 transmits the local home address L-HoA2, care-of addresses CoA2-1 and CoA2-2, and a user preference 2 in a provisional response signal (Session Progress) to the local home agent 21-1 via the access network 21a (step S12). Here, the contents of the transmission from the mobile communications terminal UE2 to the local home agent 21-1 are the same as the contents of the transmission from the mobile communications terminal UE1 to the local home agent 20-1.

Receiving the provisional response signal (Session Progress) from the mobile communications terminal UE2, the local home agent L-HA 21-1 stores therein the local home address L-HoA2, the care-of addresses CoA2-1 and CoA2-2, and the user preference 2, and in cooperation with a PDF (Policy Decision Function) 21-2, creates a list of access networks providing services to the mobile communications terminal UE2 in order appropriate for this communication, taking into account QoS, an operator policy, etc., as well as the care-of addresses CoA2-1 and CoA2-2 and the user preference transmitted from the mobile communications terminal UE2 (step S13).

The local home agent L-HA 21-1 includes the created access network list in a provisional response signal (Session Progress), and transmits it to the local home agent L-HA 20-1 (step S14).

Receiving the provisional response signal (Session Progress) from the local home agent L-HA 2-2 of the visited network VN 21, the local home agent L-HA 20-1 of the visited network VN 20, in cooperation with a PDF 20-2, selects an optimum access network for the mobile communications terminal UE1, taking into account QoS, an operator policy, etc., as well as the access network list transmitted from the local home agent L-HA 21-1 and the care-of addresses CoA1-1 and CoA1-2 and the user preference transmitted from the mobile communications terminal UE1 (step S15). In this embodiment, the access network 20b is selected.

The local home agent L-HA 20-1 includes the selected access network in a provisional response signal (Session Progress), and transmits it to the mobile communications terminal UE1 (step S16).

Receiving the provisional response signal (183 Session Progress) from the local home agent L-HA 20-1, the mobile communications terminal UE1 recognizes that the access network 20b has been selected, and reserves radio resources for performing communications via the access network 20b (step S17).

Further, the mobile communications terminal UE1 includes information on the type of the selected access network 20b in an acknowledgment signal (PRACK) responsive to the provisional response signal (Session Progress), and transmits it to the local home agent L-HA 21-1 on the called-side network 21 (step S18).

The information on the type of the selected access network may be included in the acknowledgement signal (PRACK) and transmitted to the local home agent L-HA 21-1 by the local home agent L-HA 20-1 that has actually made the selection.

Receiving the acknowledgement signal (PRACK) from the mobile communications terminal UE1, the local home agent L-HA 21-1, in cooperation with the PDF 21-2, selects an optimum access network for the mobile communications terminal UE2, taking into account QoS, an operator policy, etc., as well as the selected access network reported from the mobile communications terminal UE1 and the care-of addresses CoA2-1 and CoA2-2 and the user preference transmitted from the mobile communications terminal UE2 (step S19). In this embodiment, the access network 21b is selected. The local home agent L-HA 21-1 includes the selected access network 21b in an acknowledgement signal (PRACK), and transmits it to the mobile communications terminal UE2 (step S20).

Receiving the acknowledgement signal (PRACK) from the local home agent L-HA 21-1, the mobile communications terminal UE2 recognizes that the access network 21b has been selected, and reserves radio resources for performing communications via the access network 21b (step S21).

Thereafter, the mobile communications terminal UE2 includes the fact that the selected access network is the access network 21b in a response signal (OK) to the acknowledgement signal (PRACK) and returns it to the mobile communications terminal UE1 (step S22).

Further, the mobile communications terminal UE2 returns a response signal (OK) to the call originating request signal (Invite) to the mobile communications terminal UE1 (step S23), and the mobile communications terminal UE1 returns an acknowledgement signal (ACK) responsive to the call originating request OK (Invite) to the mobile communications terminal UE2 (step S24). Thereby, the operational sequence at the start of communications is completed.

[Embodiment 2]

The above-described embodiment shown in FIG. 4A and FIG. 4B shows the case where both calling and called mobile communications terminals UEs have a network selecting function, but there may be a case where one of the terminals or networks does not have a network selecting function as in the communications between a mobile communications terminal and a fixed terminal.

Figure 5A:
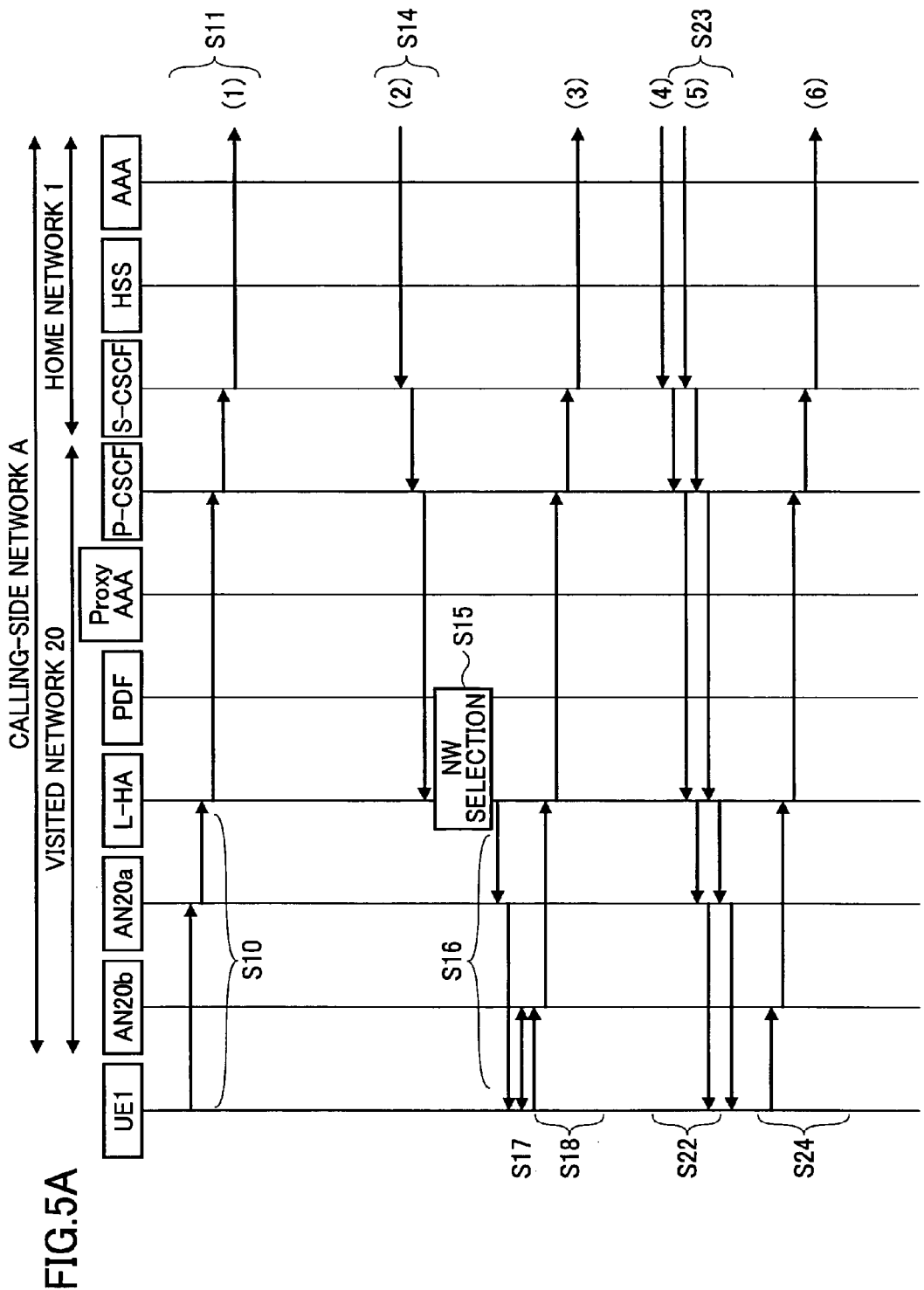
FIG. 5A is a diagram showing an operational sequence on the mobile communications terminal UE1 side at the start of communications in the case where a called-side terminal and network do not have a network selecting function.
Figure 5B:
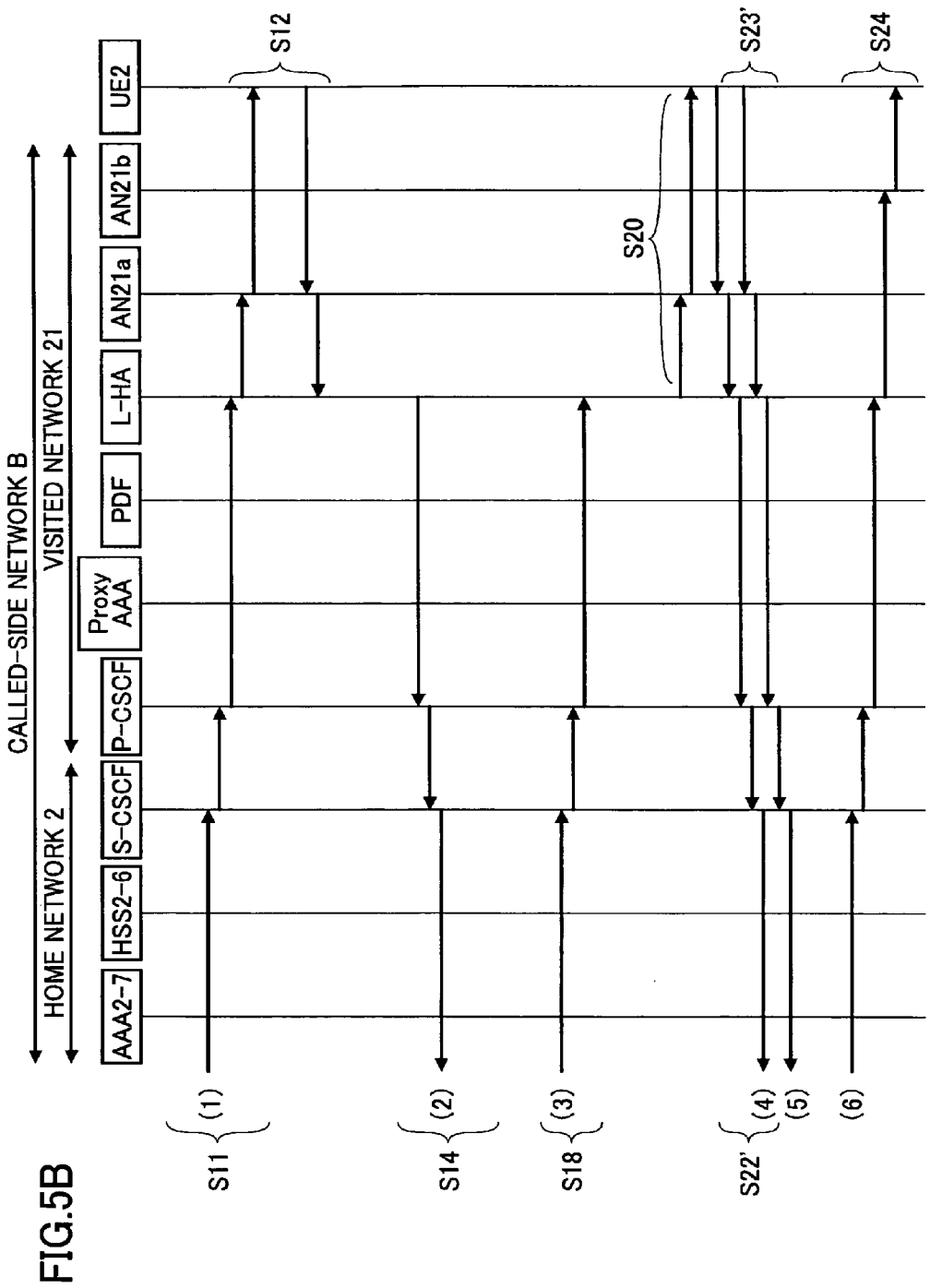
FIG. 5B is a diagram showing an operational sequence on the mobile communications terminal UE2 side at the start of communications in the case where a called-side terminal and network do not have a network selecting function.

An operational sequence at the start of communications in the case where a called-side terminal and network do not have a network selecting function is shown in FIG. 5A and FIG. 5B. The sequence in this embodiment is different from the sequence shown in FIG. 4A and FIG. 4B as follows.

The provisional response signal (Session Progress) from the mobile communications terminal UE2 to the local home agent L-HA 21-1 does not include the local home address L-HoA2, the care-of addresses CoA2-1 and CoA2-2, and the user address 2.

Accordingly, even when the local home agent L-HA 21-1 receives the provisional response signal (Session Progress) from the mobile communications terminal UE2, the local home agent L-HA 21-1 neither creates nor transmits a list of candidate access networks. (See FIG. 24B, step S13.) Further, even when receiving the acknowledgement signal (PRACK) from the mobile communications terminal UE1, the local home agent L-HA 21-1 does not select an access network. (See FIG. 4B, step S19.)

Further, the local home agent L-HA 20-1 selects an access network for the mobile communications terminal UE1 without considering the state of the called-side network, taking into account only QoS, an operator policy, etc., as well as the care-of addresses CoA1-1 and CoA1-2 and the user preference 1 transmitted from the mobile communications terminal UE1. (See FIG. 5B, steps S22' and S23'.)

FIG. 6A and FIG. 6B shows an operational sequence at the start of communications in the case where the mobile communications terminal UE2 that is a called-side terminal directly returns a response signal (OK) without a provisional response signal (Session Progress).

In this case also, no network selection is performed on the called network side. On the calling network side, the local home agent L-HA 20-1, when receiving the response signal (OK), selects an access network by taking into account only QoS, an operator policy, etc., as well as the care-of addresses CoA1-1 and CoA1-2 and the user preference transmitted from the mobile communications terminal UE1 (step S15).

[Embodiment 3]

Figure 7A:
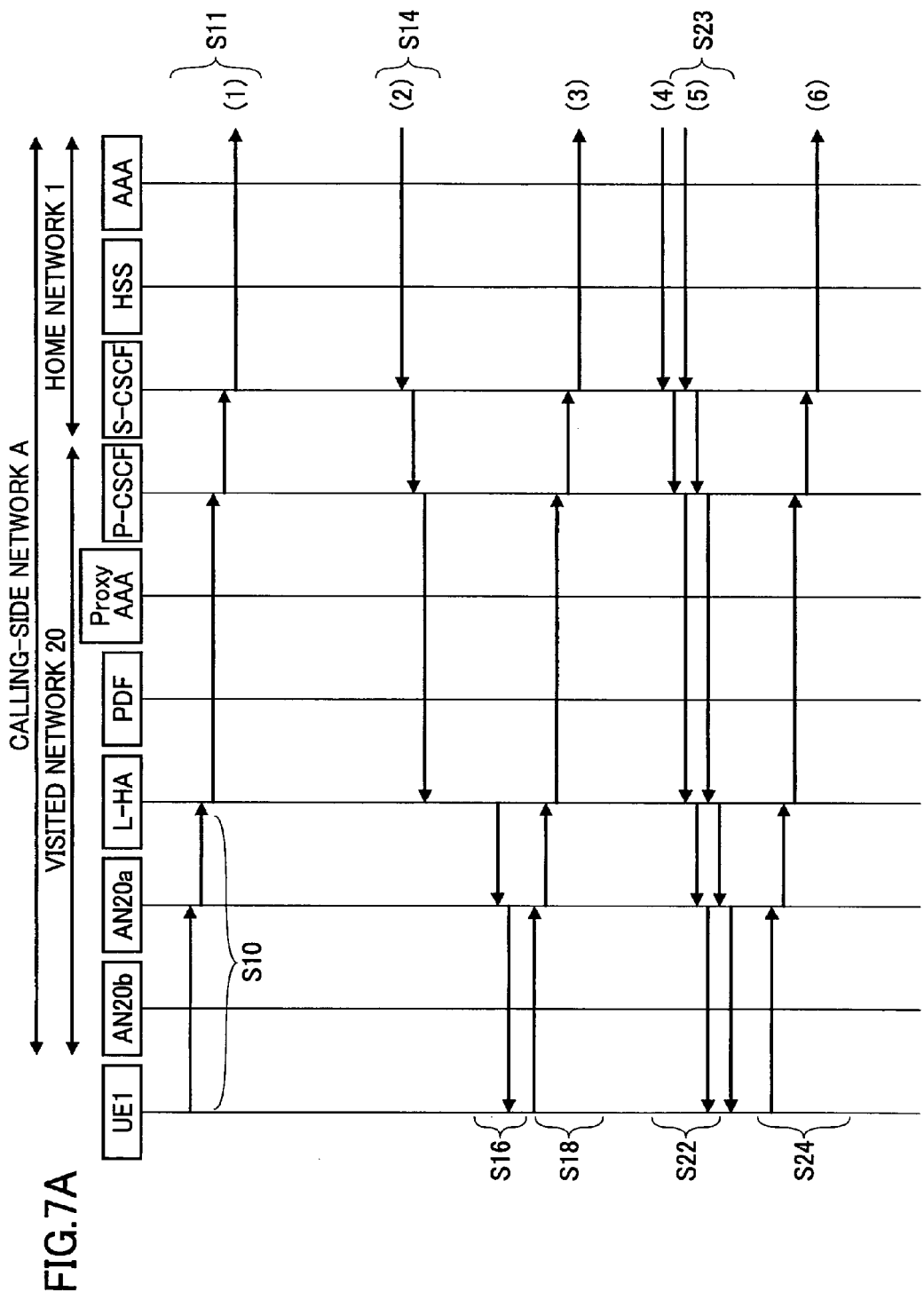
FIG. 7A is a diagram showing an operational sequence on the mobile communications terminal UE1 side at the start of communications in the case where a calling-side terminal and network do not have a network selecting function.
Figure 7B:
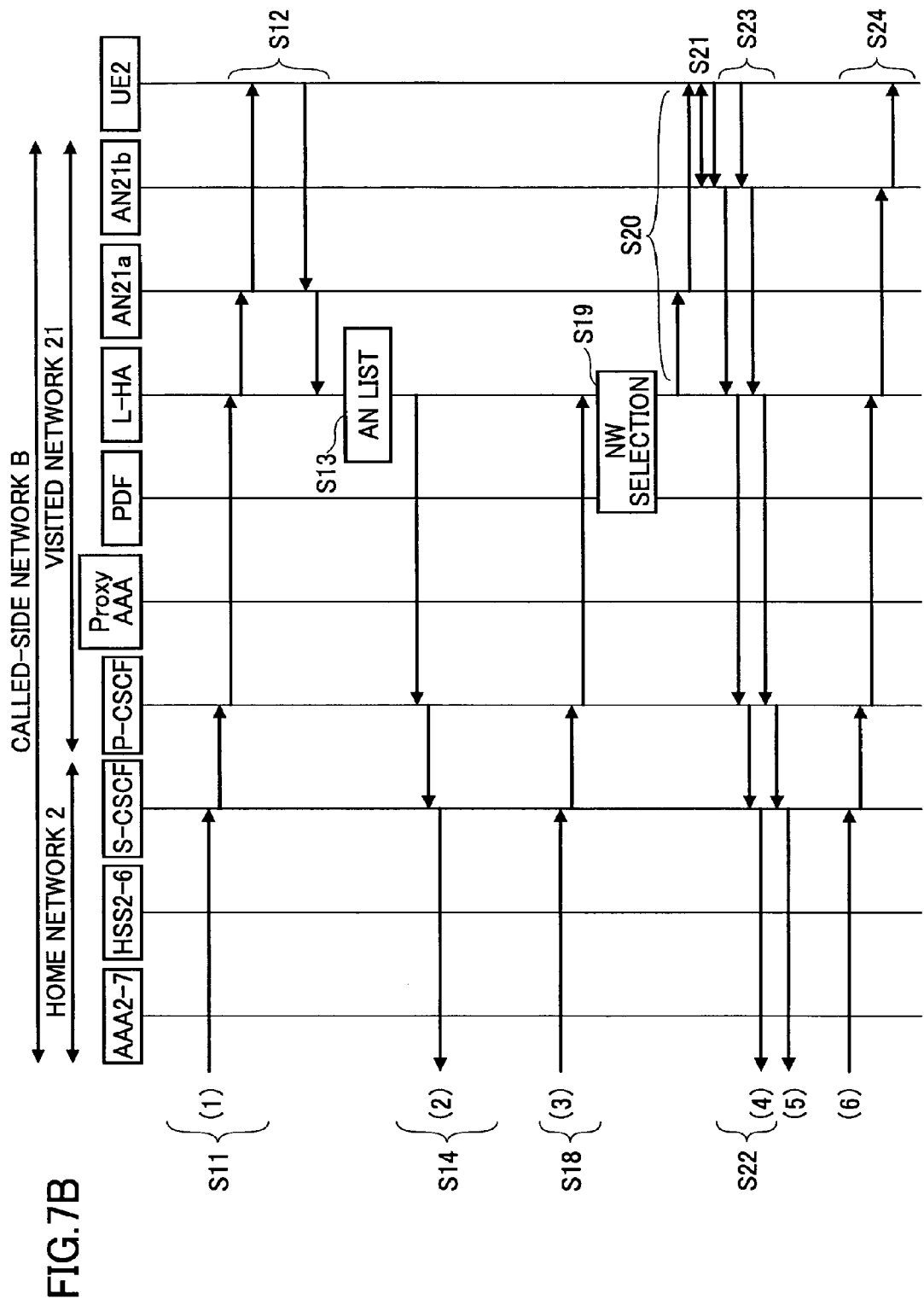
FIG. 7B is a diagram showing an operational sequence on the mobile communications terminal UE2 side at the start of communications in the case where a calling-side terminal and network do not have a network selecting function.

Further, the embodiment shown in FIGS. 7A and 7B shows an operational sequence at the start of communications in the case where a calling-side terminal and network do not have a network selecting function. Accordingly, the sequence of this embodiment is different from the sequence shown in FIG. 4A and FIG. 4B as follows.

The call originating request signal (Invite) from the mobile communications terminal UE1 to the local home agent L-HA 20-1 does not include the local home address L-HoA1, the care-of addresses CoA1-1 and CoA1-2, and the user address.

The local home agent L-HA 20-1 does not select an access network even when receiving the provisional response signal (Session Progress) from the local home agent L-HA 21-1. (See FIG. 4A, step S15.)

The local home agent L-HA 21-1 selects an access network for the mobile communications terminal UE2 without considering the state of the calling-side network, taking into account only QoS, an operator policy, etc., as well as the care-of addresses CoA2-1 and CoA2-2 and the user preference 2 transmitted from the mobile communications terminal UE2.

Figure 8A:
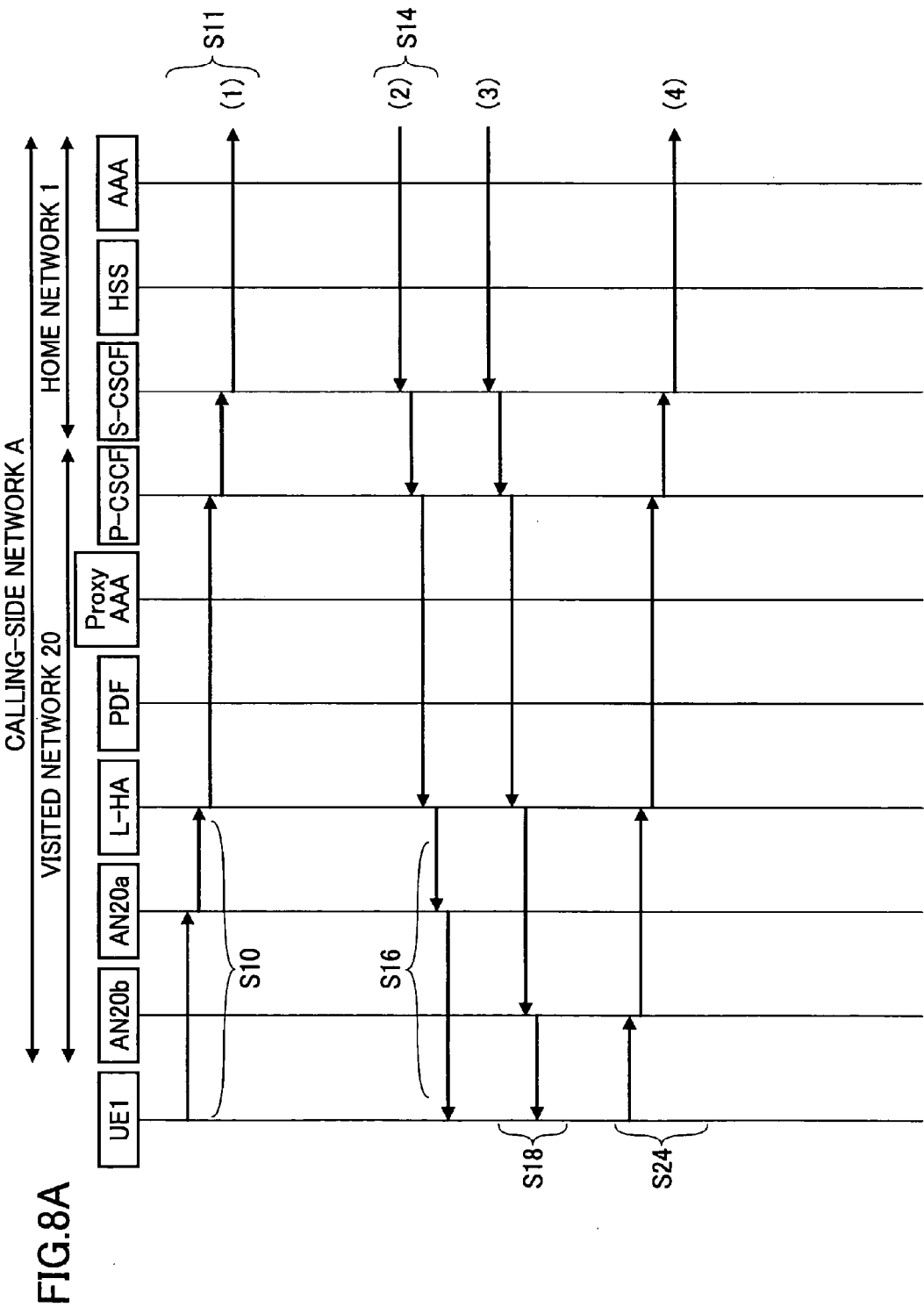
FIG. 8A is a diagram showing an operational sequence on the mobile communications terminal UE1 side at the start of communications in the case where a calling-side terminal does not support an acknowledgment signal (PRACK)
Figure 8B:
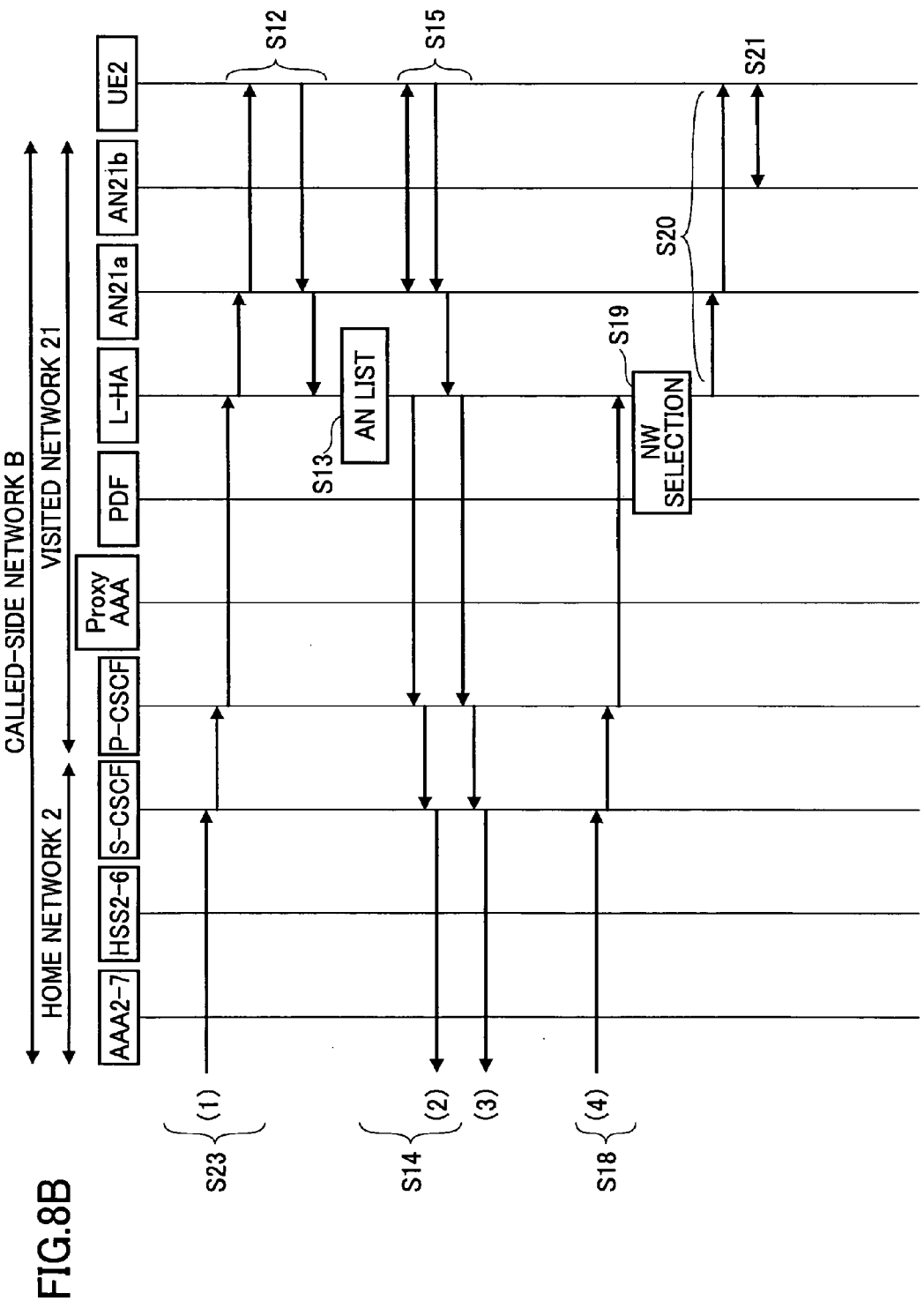
FIG. 8B is a diagram showing an operational sequence on the mobile communications terminal UE2 side at the start of communications in the case where a calling-side terminal does not support an acknowledgment signal (PRACK)

Further, FIG. 8A and FIG. 8B show an operational sequence at the start of communications in the case where a calling-side terminal does not support an acknowledgment signal (PRACK). In this case also, no network selection is performed on the calling network side. On the called network side, after transmitting a provisional response signal (Session Progress) (step S14), the mobile communications terminal UE2 further transmits a response signal (OK) (step S15).

When receiving an acknowledgement signal (ACK) from the mobile communications terminal UE1 (step S18), the local home agent 21-1 selects an access network, taking into account only QoS, an operator policy, etc., as well as the care-of addresses CoA2-1 and CoA2-2 and the user preference 2 transmitted from the mobile communications terminal UE2 (step S19).

[Embodiment 4]

Figure 9:
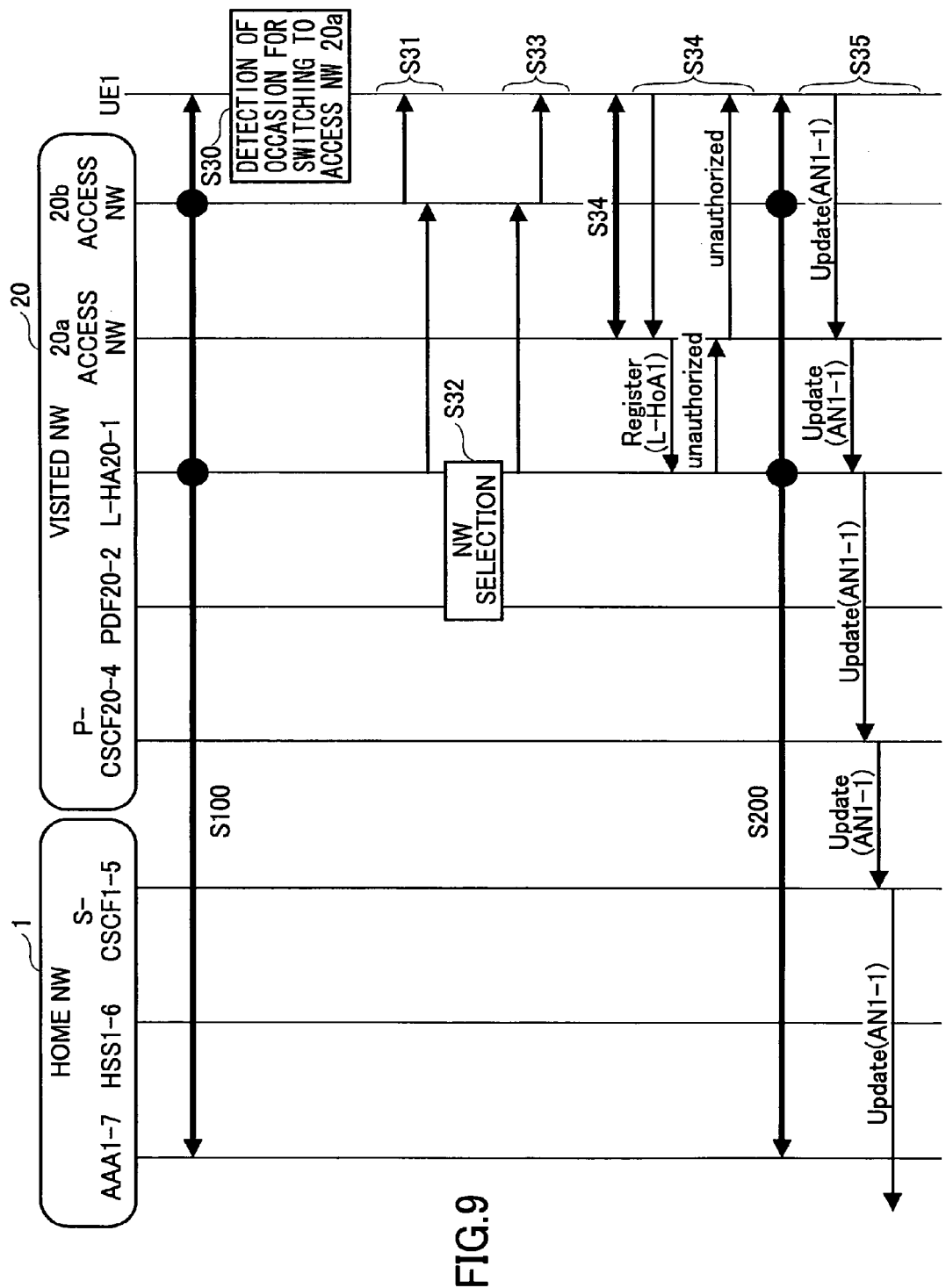
FIG. 9 is a diagram showing a handover sequence in the case where a mobile communications terminal UE in communication detects an occasion to switch access networks.

Next, as a further embodiment of the present invention, a handover sequence in the case where a mobile communications terminal UE in communication detects an occasion to switch access networks is shown in FIG. 9. Here, the mobile communications terminal UE may detect an occasion for handover when the mobile communications terminal UE, which has been receiving a streaming service by W-CDMA, has moved in a W-LAN service provision area or when the optimum access network has changed as a result of a change of service (from streaming to voice) in an environment where multiple access networks are available.

When the mobile communications terminal UE1 in communication via the access network 20b (step S100) detects a handover occasion for switching to the access network 20a (step S30), the mobile communications terminal UE1 includes the local home agent L-HoA 20-1, the care-of addresses CoA1-1 and CoA1-2, the user preference 1, and an access network selection request in a location registration information update signal (Binding Update), and transmits it to the local home agent L-HA 20-1 via the access network 20b (step S31).

Receiving the above-described request from the mobile communications terminal UE1, the local home agent L-HA 20-1, in cooperation with the PDF 20-2, selects an optimum access network for the mobile communications terminal UE1, taking into account QoS, an operator policy, etc., as well as the care-of addresses CoA1-1 and CoA1-2 and the user preference transmitted from the mobile communications terminal UE1 (step S32). In this embodiment, the access network 20a is selected.

The local home agent L-HA 20-1 includes the selection information of the selected access network 20a in a response signal (Binding Ack), and transmits it to the mobile communications terminal UE1 (step S33).

Receiving the response signal (Binding Ack) from the local home agent L-HA 20-1, the mobile communications terminal UE1 recognizes that the access network 20a has been selected, and reserves radio resources for performing communications via the access network 20a (step S34).

The mobile communications terminal UE1 notifies the local home agent L-HA 20-1 of the reservation of radio resources through a location registration information update signal (Binding Update) (step S34). Receiving this location registration information update signal, the local home agent L-HA 20-1 thereafter transfers user data to the mobile communications terminal UE1 via the access network 20a (step S200).

After completion of this handover, the mobile communications terminal UE1 may notify a correspondent mobile communications terminal UE of a change of the access network that it uses (Update) (step S35), so that the correspondent mobile communications terminal UE may perform handover in response to this notification as a trigger.

Figure 3:
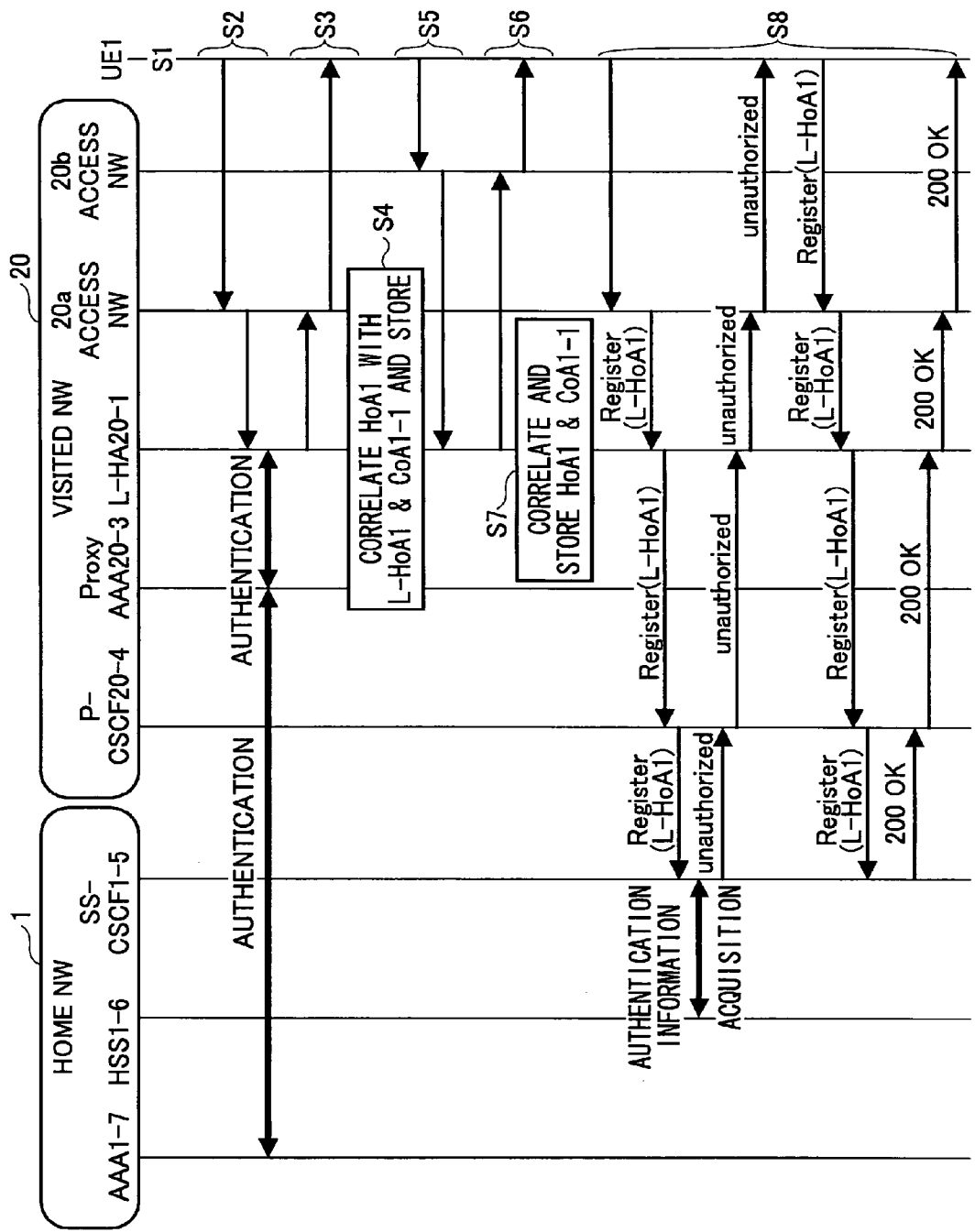
FIG. 3 is a diagram showing a procedure for acquiring a local home address (L-HoA) and a care-of address (CoA) and performing registration with S-CSCF in a home network HN 1 by the mobile communications terminal UE1.

Further, in the case where both networks have the function of selecting an access network as shown in the embodiment shown in FIG. 3, the local home agent L-HA 20-1 can acquire information on the type of the access network that is being used by the network where the correspondent exists through a notification in the call originating and receiving sequence shown in FIG. 3 or the above-described notification after handover. Accordingly, in this case, the local home agent L-HA 20-1 can select an access network, taking into account the type of the access network that is being used by the network where the correspondent exists as well.

Figure 10:
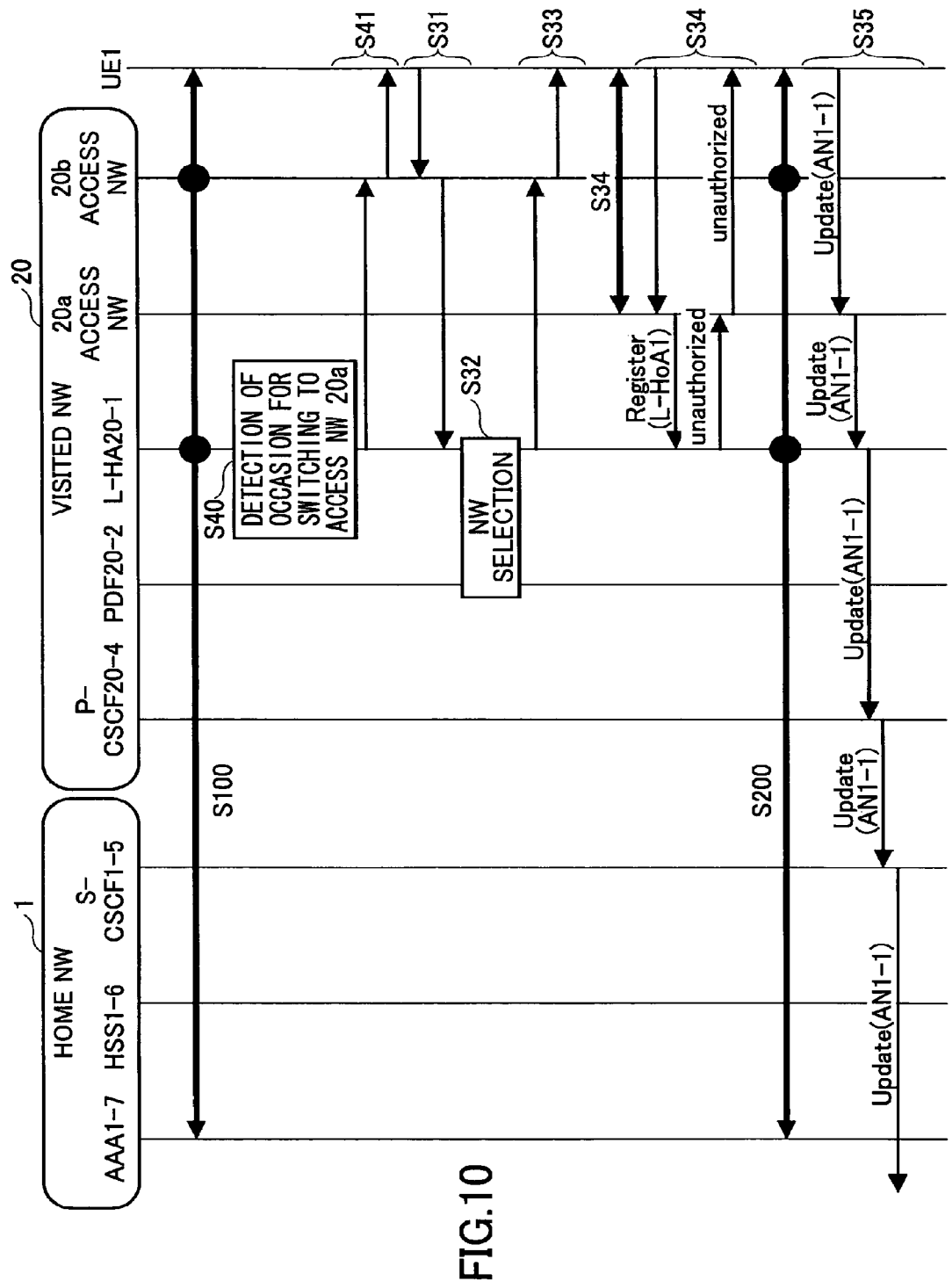
FIG. 10 is a diagram showing a handover sequence in the case where a device in the network detects an occasion.

FIG. 10 shows a handover sequence in the case where a device in the network detects an occasion. Here, the device in the network may detect a handover occasion when a streaming service has been provided to a mobile communications terminal UE through W-CDMA but it has become possible to provide the service through W-LAN because of a change in the resource conditions of the access network of W-LAN.

When the local home agent L-HA 20-1, which is providing a service to the mobile communications terminal UE1 via the access network 20b, detects a handover occasion (step S40), the local home agent L-HA 20-1 transmits a handover occasion notification signal to the mobile communications terminal UE1 (step S41).

The operations of the mobile communications terminal UE1 and the local home agent L-HA 20-1 after reception of the signal are the same as described in the above-described embodiment of FIG. 9.

Here, in the above description of the embodiments, it is assumed that the local home agent L-HA and the PDF are provided in the visited network (VN). However, the effects due to application of the present invention remain the same even when their functions are provided in the home network HN.

Further, the embodiments are described on the assumption that the local home agent L-HA and the PDF are independent devices. However, the effects are the same even when their functions are provided in an existing device (such as P-CSCF).

Further, the information communicated as candidate access networks available to the mobile communications terminals UE1 and UE2 is not explicitly shown in the above-described embodiments, but the care-of addresses CoAs of all access networks (currently) available to the mobile communications terminals UE1 and UE2 at that point may be transmitted or only the care-of address of a particular access network selected in accordance with a service or a user preference may be transmitted. The effects produced by the present invention remain the same whichever one of these manners is applied.

Further, the above-described embodiments show the cases where both calling and called sides are mobile communications, but the effects of the present invention remain the same even if one of them is a fixed network terminal or a server.

Further, the above-described embodiments show the cases where SIP is used for a protocol, but the effects of the present invention remain the same even if other protocols are applied.

[Embodiment 5]

In the above-described embodiments, all of the access networks provided in the visited networks VNs are managed by the same operator. In the below-described embodiment, multiple networks (visited networks VNs) of different operators are connected to a home network HN to which a user belongs, and each network includes multiple access networks. In other words, access network options for a user include those of different operators. In this case, from a network of one operator, it is impossible to know the details of the situation of a network of another operator. Accordingly, it is difficult to determine an appropriate combination of access networks only with the techniques described in the first through fourth embodiments.

In the invention according to the following embodiment, when multiple access networks are provided by multiple operators, a terminal notifies a device in the network of the type of an available access network and a user preference. Taking into account, in addition to these information items, what service or application a user has requested, whether it is in a wired network, the resource conditions in a radio section, an operator policy, etc., each device in the network can select a visited network VN and an access network at the time of originating a call and the time of receiving a call. Further, if both calling network side and called network side have the above-described network selecting function, devices in the network notify each other of candidates for an access network to be selected or a selected access network. As a result, it is possible to select an access network in a network, which access network is suitable for the candidates for the access network to be selected or the selected access network in the network where the correspondent exists.

Further, the present invention is also applicable in the case where an identifier is provided for each individual access network and a visited network VN itself has its own mobility control function with multiple access networks connected to the visited network VN as its subordinates as GPRS of 3GPP. In this case, a home network HN selects one of the visited networks VN having access networks and the mobility control function, and the VN identifies the access networks that it manages. This makes it possible to select an optimum combination of access networks between the calling side and the called side.

According to the present invention, it is possible to implement the function of selecting an optimum access network at the time of originating and receiving a call and during communication based on various conditions as well as a user preference in a communications network having multiple access networks, and there is no fixation to the result of selection at the time of location registration.

An embodiment of the present invention in the case of applying SIP as a protocol in a mobile communications network is shown below.

Figure 11:
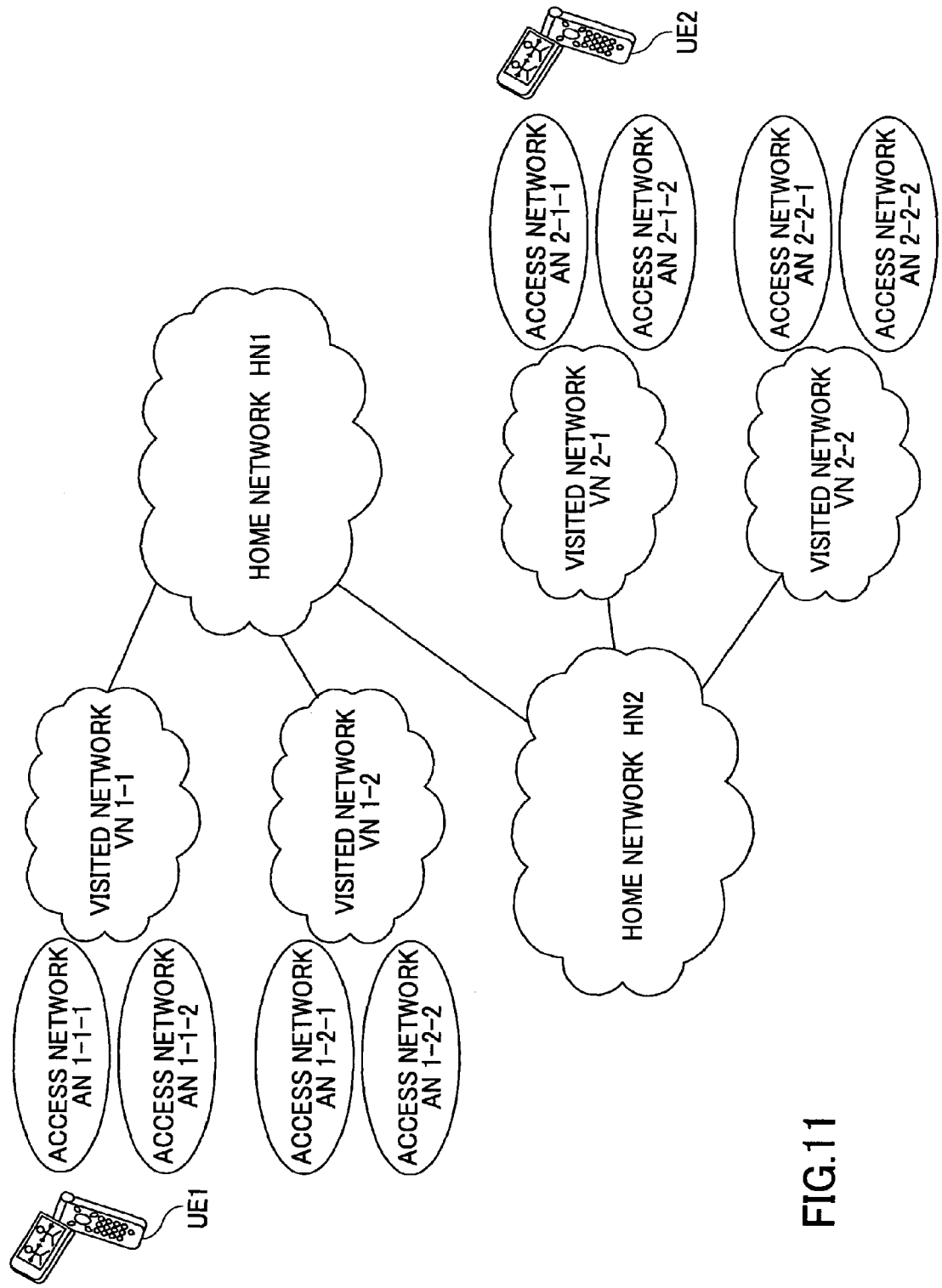
FIG. 11 is a configuration diagram of a mobile communications network that implements the present invention.

FIG. 11 is a configuration diagram of a mobile communications network that implements the present invention. UE1 and UE2 are mobile communications devices that actually perform communications in the present invention, and are assigned their respective home addresses (HoAs) HoA1 and HoA2 by home networks (HNs) to which they subscribe. HN1 and HN2 are mobile communications service provision networks to which UE1 and UE2 subscribe, respectively. Further, visited networks VN 1-1 and VN 1-2 and visited networks VN 2-1 and VN 2-2 are networks that UE1 and UE2 visit. These visited networks VNs are managed by different operators in this embodiment. Further, access networks AN 1-1-1 and AN 1-1-2 are access means provided to UE1 by VN 1-1. AN 1-2-1 and AN 1-2-2 are access means provided to UE1 by VN 1-2. AN 2-1-1 and AN 2-1-2 are access means provided to UE2 by VN 2-1. AN 2-2-1 and AN 2-2-2 are access means provided to UE2 by VN 2-2.

The access network may be a wide area network such as a W-CDMA mobile communications network or a wireless LAN provided in a hot spot manner. Alternatively, the access network may be a network advantageous to real-time data such as voice data or a network advantageous to non-real-time data. Various access networks may be provided from various operators at various locations, and a user may exist in one or more of them.

Figure 12:
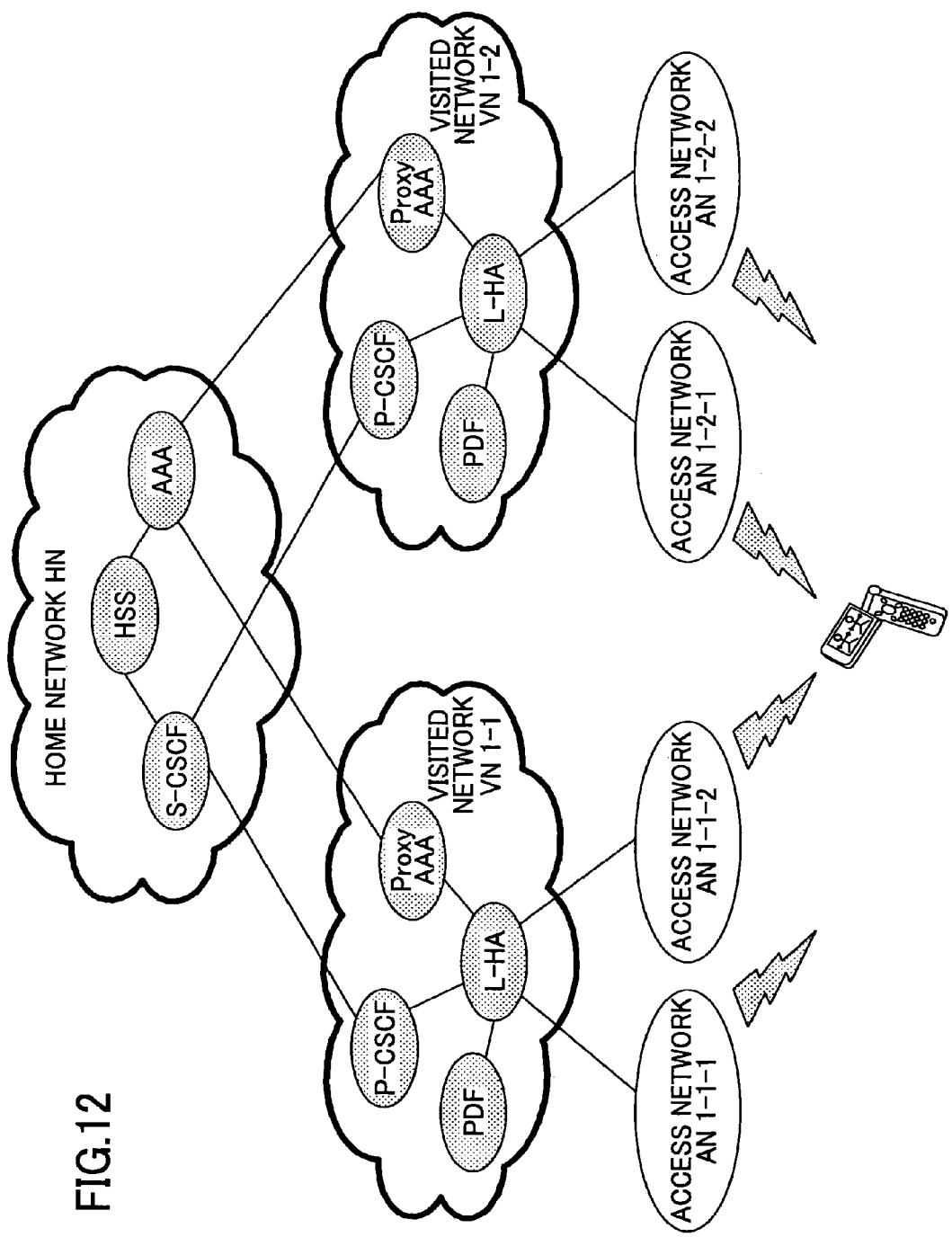
FIG. 12 is a diagram showing a disposition of functions that implements the present invention.

FIG. 12 shows a function configuration corresponding to a user device (for example, UE1) in a disposition of functions for implementing the present invention. The correspondent of this user may be in a similar communications environment. A local home agent L-HA, which is a function part newly provided by the present invention, has the function of assigning a local home address L-HoA to a mobile communications terminal UE that moves in a service provision range and the function of selecting an optimum access network based on the type of an available access network and a user profile transmitted from UE, QoS, an operator policy, etc.

The user device or mobile communications device UE1 has the function of performing communications based on multiple radio systems and has the function of being assigned a care-of address (CoA) for each corresponding radio system and the L-HoA of a visited network VN where it exists and storing them. Further, UE has the function of notifying L-HA, at the time of requesting to originate a call and at the time of responding to a received call, of a care-of address (CoA) corresponding to an available radio system (access network) at that time, a user preference, L-HoA, etc.

In FIG. 12, L-HA and PDF are shown as independent devices or function parts, but their functions may be provided in an existing device (for example, P-CSCF).

Figure 13A:
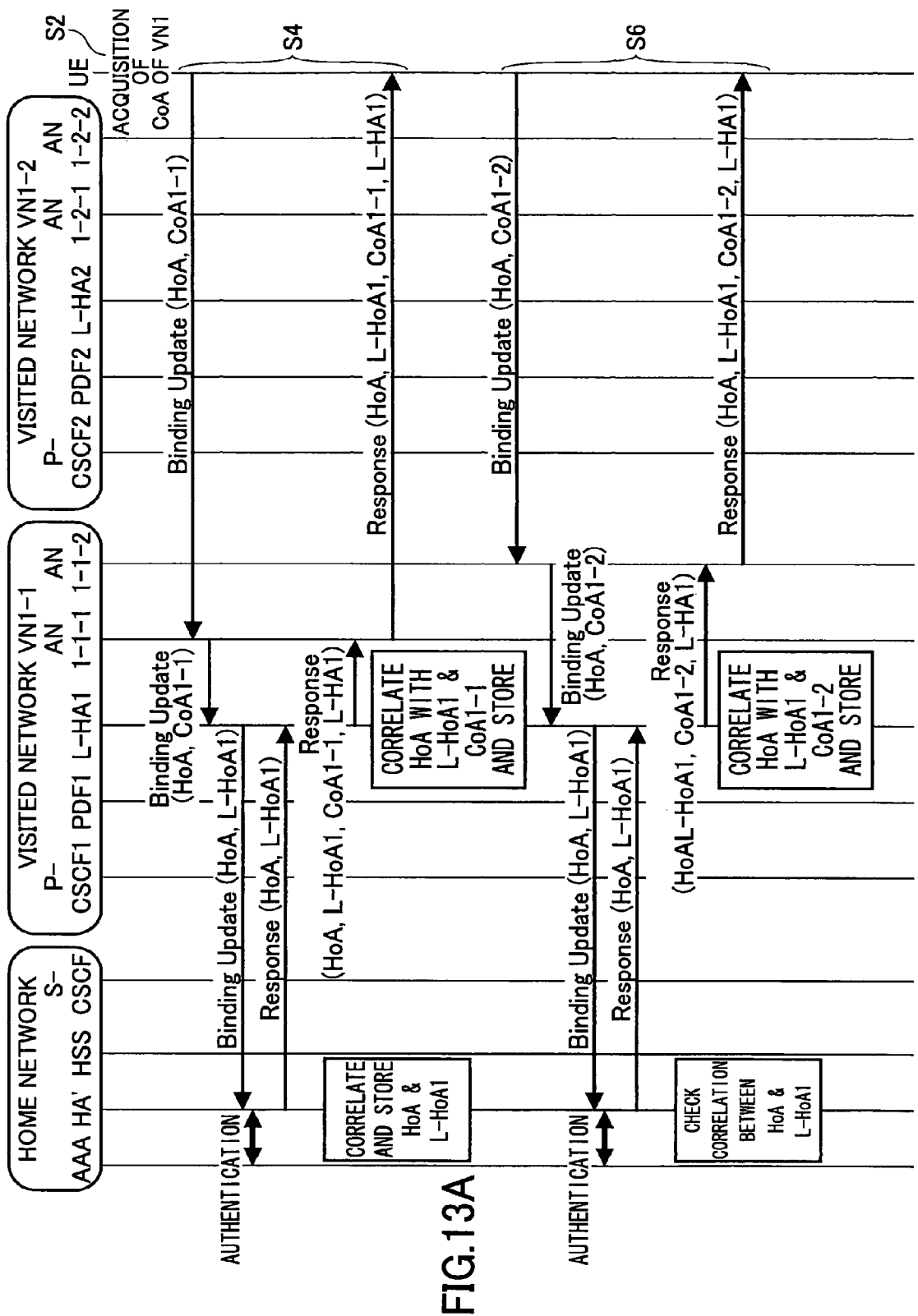
FIG. 13A is a diagram showing a location registration procedure.
Figure 13B:
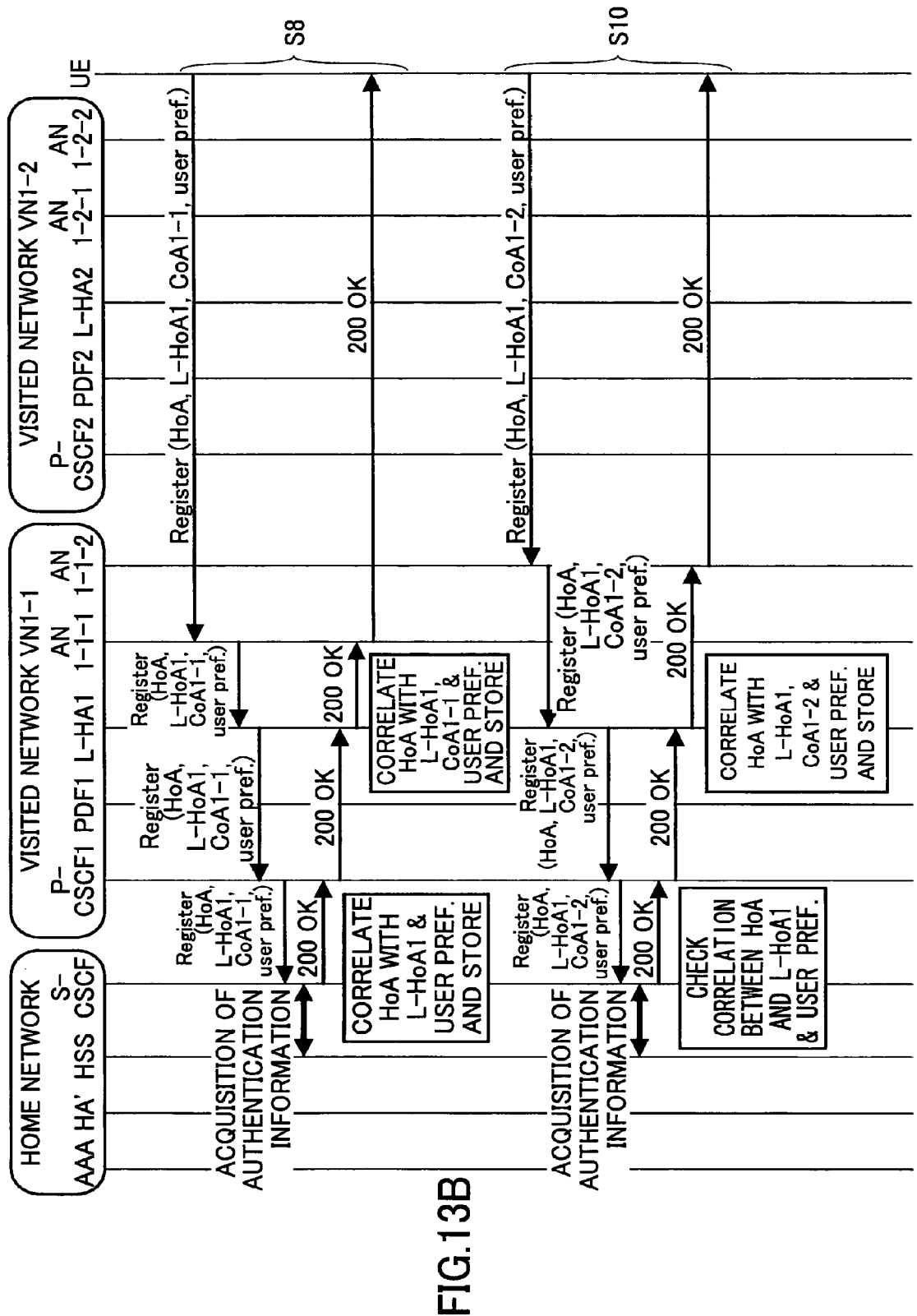
FIG. 13B is a diagram showing the location registration procedure.

FIG. 13A and FIG. 13B show a procedure for acquiring L-HoA and CoA and performing registration with S-CSCF by UE1. The same procedure is followed with respect to UE2.

As shown in FIG. 13A, when UE1 moves in the service provision area of a visited network VN and receives the radio wave of AN 1-1 or AN 1-2, UE1 is assigned CoA by each access network (CoA1-1 and CoA1-2) (S2).

UE1 registers HoA1 assigned thereto by the home network HN and CoA1-1 assigned thereto by AN 1-1 with L-HA1 via AN 1-1 (S4).

When receiving the registration from UE1, L-HA1 refers to a table it retains, and determines whether L-HoA corresponding to HoA1 has been assigned. If L-HoA has not been assigned, L-HA1 assigns L-HoA1 to UE1, includes it in a response to the registration, and transmits it to UE1.

UE1 registers HoA1 and CoA1-2 with L-HA1 via AN 1-2 in the same procedure (S6).

Since L-HA1 has already assigned L-HoA1 to UE1, L-HA1 makes only a response of registration completion to UE1.

As shown in FIG. 13B, upon completion of registration of all acquired CoAs with L-HA1 and acquisition of L-HoA1, UE1 registers L-HoA1 with S-CSCF in the home network HN to which it subscribes (S8, S10).

By the above-described procedure, acquisition of L-HoA and CoA and registration with S-CSCF by UE are completed.

In the procedure of FIGS. 13A and 13B, two binding updates and two registration requests are made because there are two available access networks. If the number of access networks is different, binding updates (Binding Update) and registration requests (Register) corresponding to that number are made. In general, the procedure of FIG. 13A is an address registration procedure for the address table of a router in mobile IP, and the procedure of FIG. 13B is an address registration procedure for originating and receiving a call in 3GPP SIP protocol. The same addresses are registered in each procedure, but by performing them separately as graphically illustrated, it is possible to make preparations for the present invention without changing existing protocols.

Figure 14A:
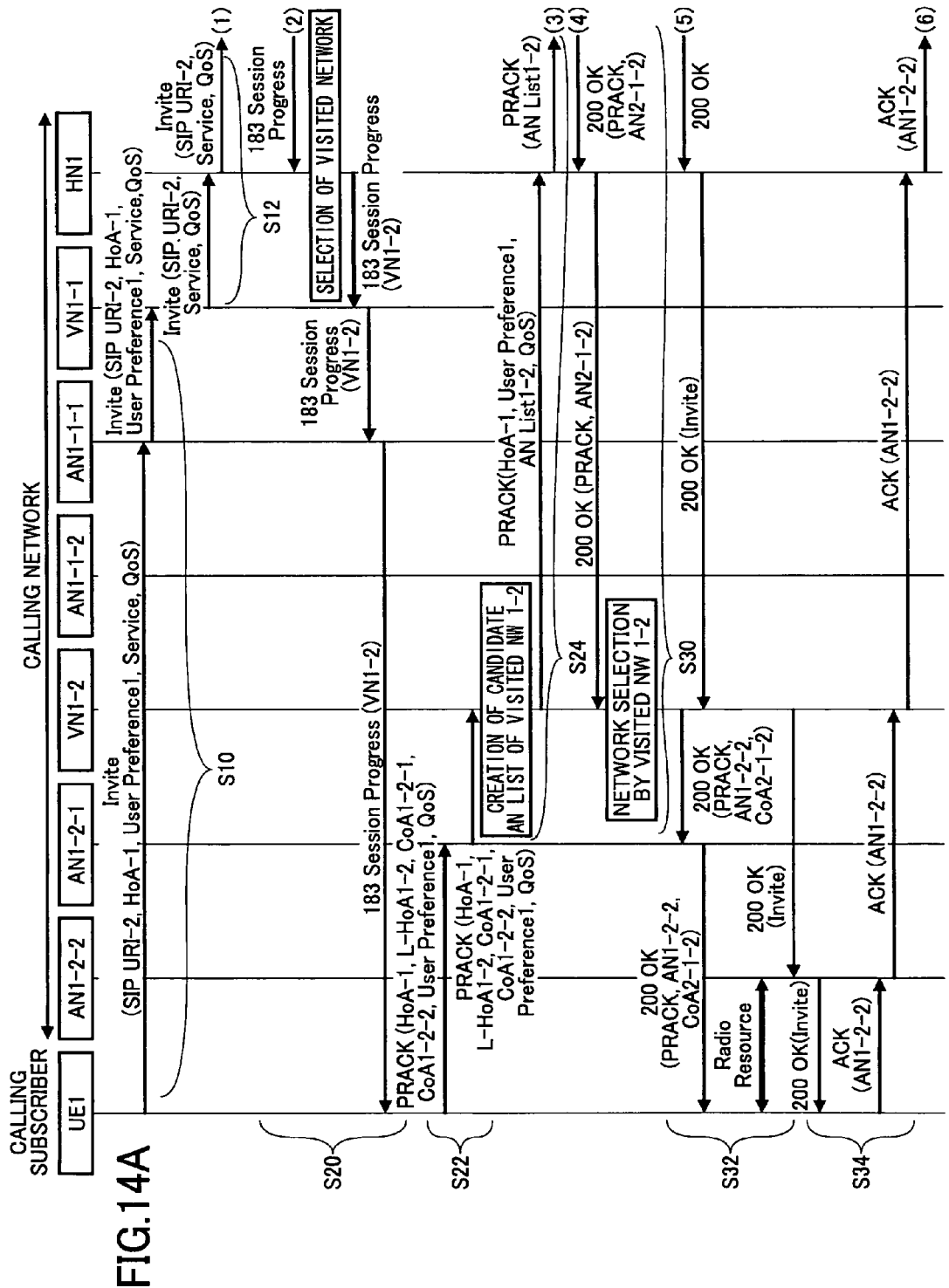
FIG. 14A shows a calling-side sequence diagram in the case where a home network HN statically selects only a visited network VN and the visited network VN dynamically selects an access network AN.

FIG. 14A and FIG. 14B show an operational sequence at the start of communications in the case where a communication request has been transmitted from UE1 to UE2 when a home network HN statically selects a visited network VN and the visited network VN dynamically selects an access network AN. A description is given below of the meanings of statically and dynamically. FIG. 14A shows an operational sequence on the calling side (UE1 side), an FIG. 14B shows an operational sequence on the called side (UE2 side).

In the graphically illustrated case, six signals are exchanged between UE1 and UE2. They are (1) a call originating request (Invite) by UE1, (2) 183 Session Progress by UE2, (3) PRACK by UE1, (4) 200-OK (such as PRACK) by UE2, (5) 200-OK (Invite) by UE2, and (6) ACK by UE1.

UE1 includes HoA1, a user preference 1, a service type, and a QoS request in a call originating request signal (Invite), and transmits it to VN 1-1 (L-HA1-1) via AN 1-1-1 (S10). Here, L-HA determines from which UE the received call originating request signal has come by using HoA1. Further, the user preference 1 is information for notifying L-HA1-1 on what basis the user of UE1 wishes to have network selection performed (for example, with priority on communications speed, priority on communications cost, etc.).

Receiving the call originating request signal (Invite) from UE1, VN 1-1 (L-HA1-1) stores therein L-HoA1-1, CoA1-1-1, CoA1-1-2, and the user preference 1, and issues a call originating request signal to UE2 (S12). In the graphically illustrated case, the call originating request signal is transmitted to VN-1 via AN 1-1-1. However, this selection of an access network and a visited network VN is provisional and subject to change after progress in the subsequent procedure.

As shown in step S14 of FIG. 14B, HN2, which is a home network HN on the called side (UE2 side), selects a visited network NW suitable for the requested service, and transmits the call originating request signal (Invite) to UE2 via the selected visited network VN (VN 2-1 in this case). In this embodiment, this visited network VN selected by HN2 is not to be changed even after progress in the subsequent procedure. In other words, this selection is not provisional. Which one of multiple visited networks VNs is selected is determined based on a predetermined criterion independent of the conditions of communications of UE2. "Statically determined" means being thus determined by HN2 independent of the conditions of communications of UE2. On the other hand, VN 2-1 selected by HN2 provisionally selects one of its subordinates access networks, and communicates with UE2 through it. In the graphically illustrated case, AN 2-1-1 is provisionally selected.

Receiving the call originating request signal (Invite), UE2 includes L-HoA2, CoA2-1-1, CoA2-1-2, and a user preference 2 in a provisional response signal (183 Session Progress), and transmits the provisional response signal to VN 2-1 (L-HA2-1) via AN 2-1-1 (S16). Here, the contents of the transmission from UE2 to VN 2-1 (L-HA2) are processed the same as the contents of the above-described transmission from UE1 to L-HA1-1.

Receiving the provisional response signal (183 Session Progress) from UE2, VN 2-1 (L-HA2-1) stores therein L-HoA2, CoA2-1-1, CoA2-1-2, and the user preference 2 from UE2. Further, VN 2-1, in cooperation with PDF2-1 in VN 2-1, creates a list of access networks ANs providing services to UE2 (a list of ANs arranged in order suitable for this communication), and retains it in its storage means. VN 2-1 issues the contents of the list and a provisional response signal (183 Session Progress) to UE1 (S18). In creating the list, QoS, an operator policy, etc., as well as CoA2-1-1, CoA2-1-2, and the user preference 2 transmitted from UE2 are considered. The contents of the information transmitted as candidate access networks available to UE2 may vary. For example, CoAs of all access networks ANs available to UE2 at that time may be transmitted, or only the care-of address of a particular access network AN selected in accordance with a service or a user preference may be transmitted, or other information may be transmitted.

As shown in S20 of FIG. 14A, HN1, which is the home network of UE1, selects a visited network VN suitable for the requested service. This selection is also statically performed. That is, the visited network VN is determined in accordance with a predetermined condition. HN1 includes the selected visited network VN (VN 1-2 in this case) in the provisional response signal (183 Session Progress), and transmits it to UE1 through VN 1-1 from which the call originating request from UE1 has been received. That is, information indicating the finally determined visited network VN (VN 1-2 in the graphically illustrated case) is reported to UE1 through provisionally determined VN 1-1 and AN 1-1-1.

Receiving the provisional response signal (183 Session Progress), UE1 includes L-HoA1, CoA1-2-1, CoA1-2-2, the user preference 1, and AN 1-2 in an acknowledgement signal (PRACK), and transmits the acknowledgement signal to VN 1-2 (L-HA1-2) (S22). Here, the contents of the transmission from UE2 to VN 2-1 (L-HA2) are the same as the contents of the above-described transmission from UE1 to L-HA1-1.

As shown in S24, receiving the acknowledgement signal (PRACK) from UE1, VN 1-2 (L-HA1-2), in cooperation with PDF1-2 in VN 1-2, creates a list of access networks ANs providing services to UE1 (a list of ANs arranged in order suitable for this communication). The list is created by taking into account QoS, an operator policy, etc., as well as CoA1-2-1, CoA1-2-2, and the user preference 1 transmitted from UE1. L-HA1-2 includes the created access network list in an acknowledgement signal (PRACK), and transmits it to VN 2-1 (L-HA2-1).

As shown in S26 of FIG. 14B, receiving the acknowledgement signal (PRACK) from UE1, VN 2-1 (L-HA2-1), in cooperation with PDF2-1 in VN 2-1, selects an optimum access network AN for UE2 (AN 2-1-2 is selected in this embodiment), taking into account QoS, an operator policy, etc., as well as the access network AN list transmitted from UE1 and CoA2-1-1, CoA2-1-2, and the user preference 2 transmitted from UE2. VN 2-1 (L-HA2-1) includes the selected access network in an acknowledgement signal (PRACK), and transmits it to UE2. The transmission is performed through AN 2-1-1, which is being used provisionally at the moment, but thereafter, UE2 is to access AN 2-1-2 following the contents of the determination. Thus, the selection of an access network is not a static selection but is "dynamically" performed based on the actual situation of communications and the idea of UE.

As shown in S28, receiving the acknowledgement signal (PRACK) from L-HA2, UE2 recognizes that AN 2-2 has been selected. UE2 reserves radio resources for performing communications via AN 2-2. UE2 includes the fact that the selected AN is. AN 2-2 in a response signal (200 OK) to PRACK, and returns it to UE1. Further, UE2 returns a response signal (200 OK) to Invite to UE1.

As shown in S30 of FIG. 14A, receiving the response signal (200 OK) to PRACK from UE2, VN 1-2 (L-HA1-2), in cooperation with PDF1-2 in VN 1-2, selects an optimum access network AN for UE1 (AN 1-2-2 is selected in this embodiment). In this selection, QoS, an operator policy, etc., as well as the list of the access network AN selection result transmitted from UE2 and CoA1-2-1, CoA1-2-2, and the user preference 1 transmitted from UE1 are considered.

As shown in S32, VN 1-2 (L-HA1-2) includes the selected access network AN in the response signal (200 OK) to PRACK, and transmits it to UE1. Receiving the response signal (200 OK) to PRACK from L-HA1, UE1 recognizes that AN 1-2-2 has been selected, and reserves radio resources for performing communications via AN 1-2-2.

As shown in S34, UE1 includes information on the type of the selected access network AN in an acknowledgement signal (ACK) responsive to the response signal (200 OK) to Invite, and transmits it to UE2. The information on the type of the selected access network AN may be included in ACK and transmitted to UE2 by L-HA1, which has actually performed the selection.

As shown in S36 of FIG. 14B, the operational sequence at the start of communications is completed by reception of the acknowledgement signal (ACK) responsive to 200 OK (Invite) from UE1 by UE2. Thereafter, UE1 and UE2 can perform high-quality communications through the access networks appropriately selected between them.

As shown in S30 of FIG. 14A, the visited network VN 1-2 statically selected by the home network HN selects the appropriate access network AN 1-2-2 after receiving 200-OK (PRACK, AN 2-1-2). It should be noted, however, that VN 1-2 may select AN 1-2-2 at any time after the point of creation of the candidate AN list of S24. However, it is preferable to time the selection of AN as graphically illustrated in terms of simplifying the operational procedure by performing processing such as receiving and processing a signal and transmitting the signal in a unified manner in the entire system.

[Embodiment 6]

Figure 15A:
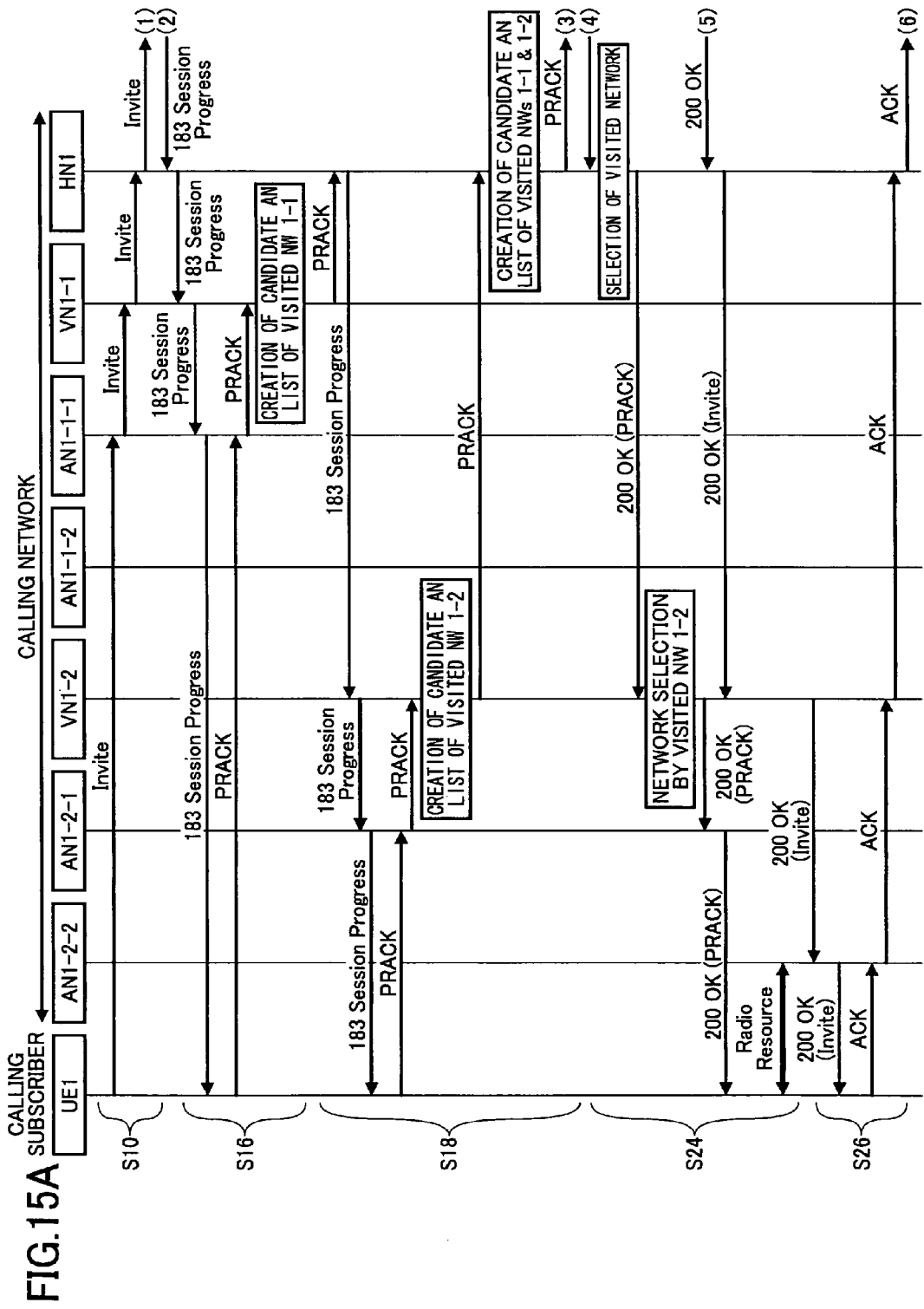
FIG. 15A shows a calling-side sequence diagram in the case where a home network HN dynamically selects only a visited network VN and the visited network VN also dynamically selects an access network AN.
Figure 15B:
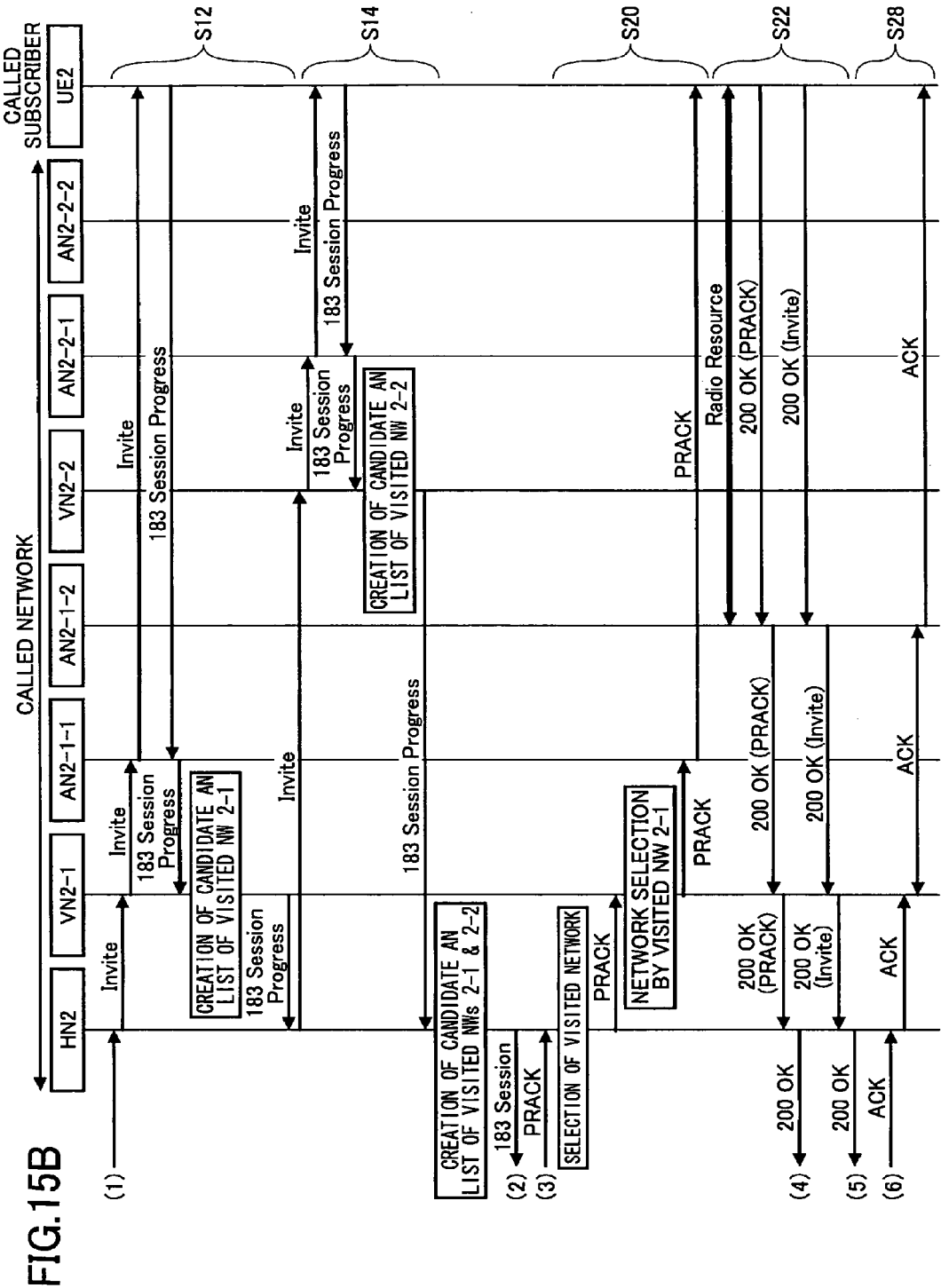
FIG. 15B shows a called-side sequence diagram in the case where a home network HN dynamically selects only a visited network VN and the visited network VN also dynamically selects an access network AN.

FIG. 15A and FIG. 15B show an operational sequence at the start of communications in the case where a home network HN dynamically selects a visited network VN and the visited network VN also dynamically selects an access network AN. The dynamic selection of the access network by the selected visited network VN is common to the technique shown in FIGS. 14A and 14B and the technique shown in FIGS. 15A and 15B. However, the technique shown in FIGS. 15A and 15B, where the home network HN also dynamically selects the visited network VN, is different in that point from the technique shown in FIGS. 14A and 14B, which statically selects it.

As shown in S10 of FIG. 15A, UE1 transmits a call originating request signal (Invite) to UE2. As shown in FIG. 15B, the call originating request signal from UE1 is transmitted to all visited networks VN 2-1 and VN 2-2 available to UE2.

As shown in parallel in S12 and S14, receiving the call originating signal (Invite), UE2 includes necessary information in a provisional response signal (183 Session Progress) the same as in the processing of S16 shown in FIG. 14B, and transmits it to each of VN 2-1 and VN 2-2. Receiving the provisional response signal (183 Session Progress) from UE2, VN 2-1 and VN 2-2 each create a list of candidate ANs providing services to UE2. The candidate AN list with respect to each VN is transmitted from HN2 to UE1 by the provisional response signal (183 Session Progress).

As shown in S16 and S18 of FIG. 15A, a list of candidate ANs is created in each of VN 1-1 and VN 1-2 on the UE1 side. In this case, HN1 transmits 183 Session Progress through not only the visited network VN through which UE1 has made the call originating request but also all visited networks VNs whose locations are registered. Receiving PRACK responsive to 183 Session Progress from UE1, each of VN 1-1 and VN 1-2 creates a list of candidate ANs in its own network. Receiving these lists, HN1 creates a list of all the candidate ANs for UE1.

As shown in S20 of FIG. 15B, HN2 selects an optimum visited network VN for UE2 (VN 2-1 is selected in this embodiment), taking into account QoS, an operator policy, etc., as well as the candidate AN list for UE1 included in PRACK received from HN1 and the candidate AN list for UE2 and the user preference 2 that it retains. The selected VN selects an appropriate AN (AN 2-1-2 is selected in the graphically illustrated case), and information on the selected VN and AN is transmitted to UE2.

As shown in S22, recognizing the contents of the transmission, UE2 reserves radio resources for performing communications via AN 2-1-2. UE2 includes the fact that the selected access network AN is AN2-1-2 in a response signal (200 OK) to PRACK, and returns it to UE1. Further, UE2 returns a response signal (200 OK) to Invite to UE1.

As shown in S24 of FIG. 15A, HN1 selects an optimum visited network VN for UE1 (VN 1-2 is selected in this embodiment), taking into account QoS, an operator policy, etc., as well as the candidate AN list for UE2 included in 200 OK (PRACK) received from HN2 and the candidate AN list for UE1 and the user preference 1 that it retains. The selected VN selects an appropriate AN (AN 1-2-2 is selected in the graphically illustrated case), and information on the selected VN and AN is transmitted to UE1. Recognizing the contents of the transmission, UE1 reserves radio resources for performing communications via AN 1-2-2.

As shown in S26, UE1 includes information on the type of the selected access network AN in an acknowledgement signal (ACK) responsive to the response signal (200 OK) to Invite, and transmits it to UE2.

As shown in S28 of FIG. 15B, the operational sequence at the start of communications is completed by reception of the acknowledgement signal (ACK) responsive to 200 OK (Invite) from UE1 by UE2. In this embodiment, a visited network VN is not statically selected, but is dynamically selected in accordance with the intention of UE. Accordingly, UE1 and UE2 can perform communications with higher quality through the access networks selected more appropriately between them. [Embodiment 7]

Figure 16B:
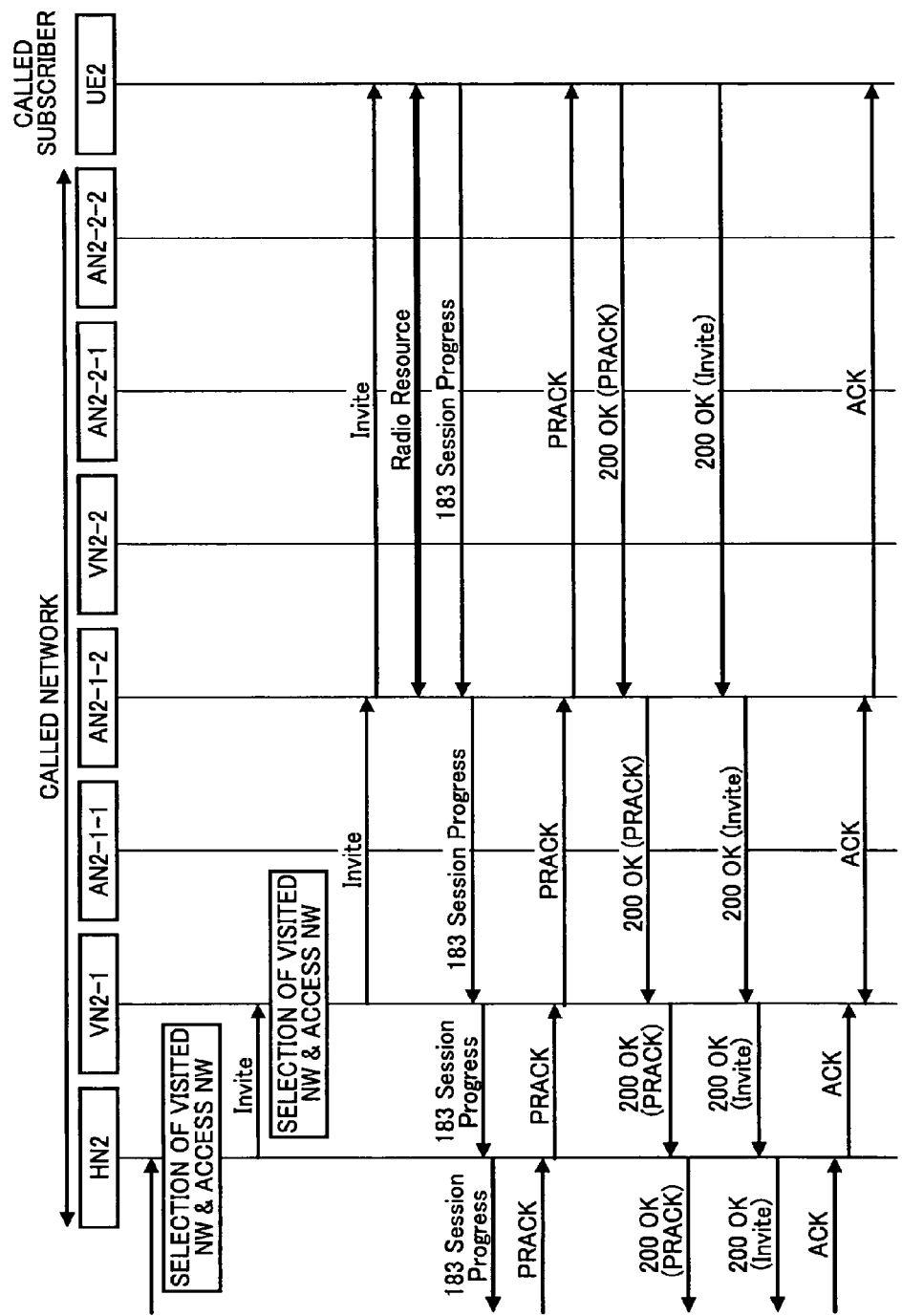
FIG. 16B shows a called-side sequence diagram in the case where a home network HN statically selects a visited network VN and an access network AN.

FIG. 16A and FIG. 16B show an operational sequence in the case where a home network HN statically selects a visited network VN and an access network AN. In the fifth and sixth embodiments, HN merely selects VN, and VN is in charge of selecting AN. In this embodiment, HN also selects AN. Further, VN and AN are statically selected. More specifically, HN2 determines not only VN but also an access network AN upon receiving Invite from UE1, and the call originating request signal (Invite) is transmitted to UE2 through the determined VN and AN (VN 2-1 and AN 2-1-2 in this case). Further, HN1 determines not only VN but also AN upon receiving 183 Session Progress from UE2, and the contents of the determined VN and AN (VN 1-2 and AN 2-1-2 in this case) are transmitted to UE1 by the provisional response signal (183 Session Progress).

In this embodiment, AN is not dynamically selected. Accordingly, the procedure for creating a list of candidate ANs is unnecessary, so that it is possible to simplify a procedure.

[Embodiment 8]

Figure 17A:
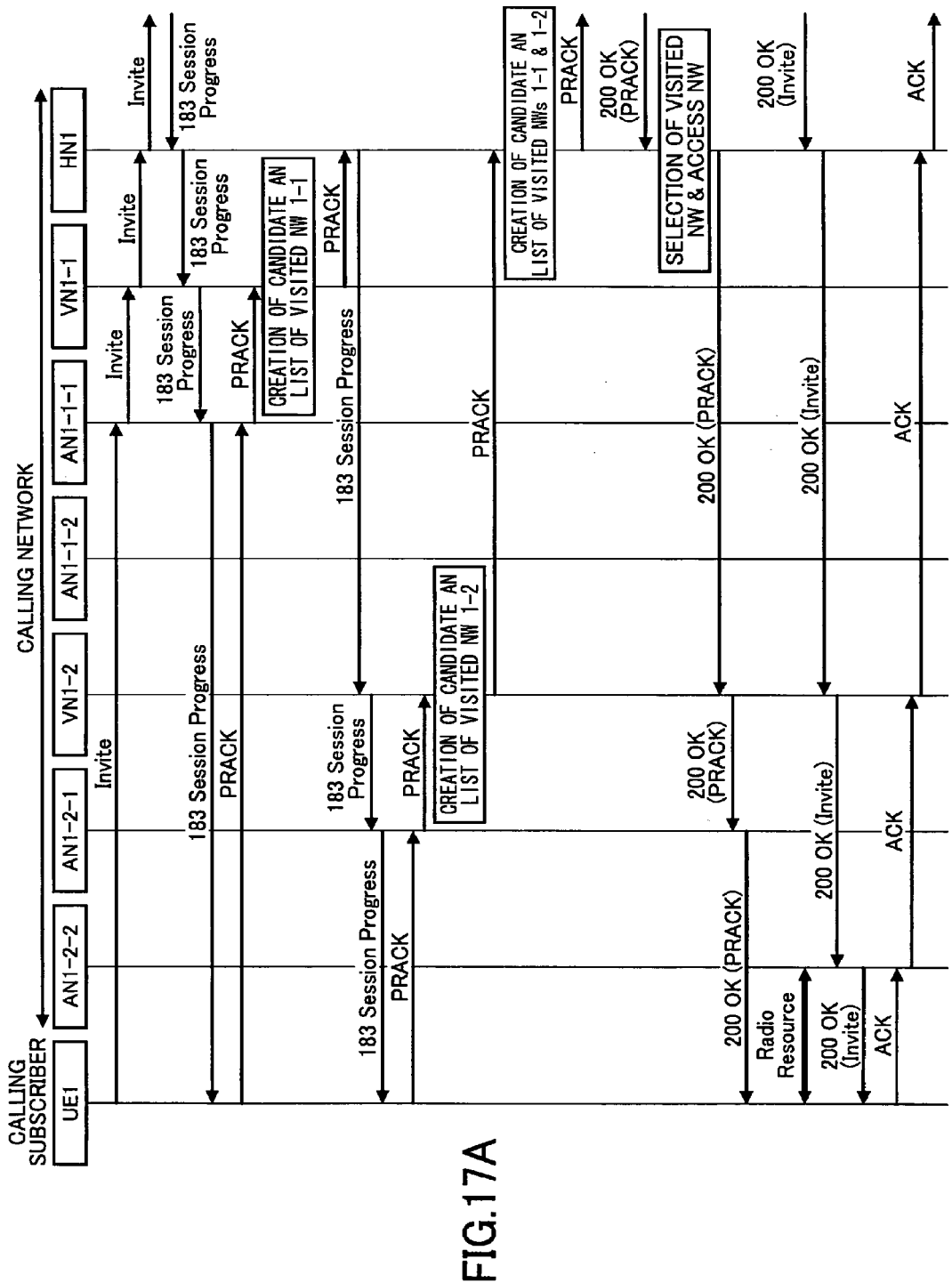
FIG. 17A shows a calling-side sequence diagram in the case where a home network HN dynamically selects a visited network VN and an access network AN.
Figure 17B:
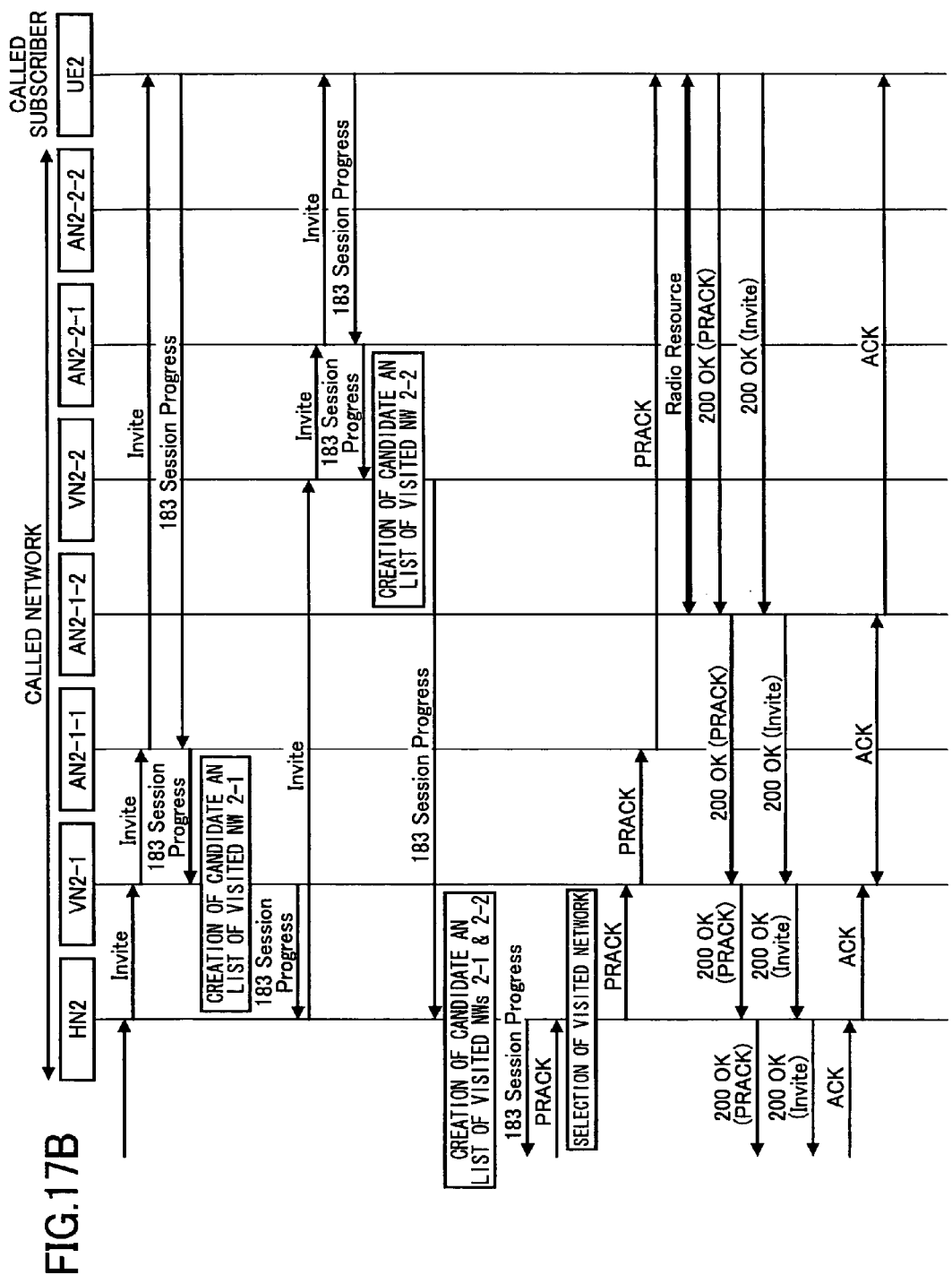
FIG. 17B shows a called-side sequence diagram in the case where a home network HN dynamically selects a visited network VN and an access network AN.

FIGS. 17A and 17B show an operational sequence at the start of communications in the case where a home network HN dynamically selects a visited network VN and an access network AN. The fact that HN selects both VN and AN is common to the seventh embodiment and this embodiment, but this embodiment is different from the seventh embodiment in that that selection is dynamically performed. The specific operational sequence is the same as the one shown in FIG. 15A and FIG. 15B except that HN selects VN and AN.

[Embodiment 9]

Figure 18A:
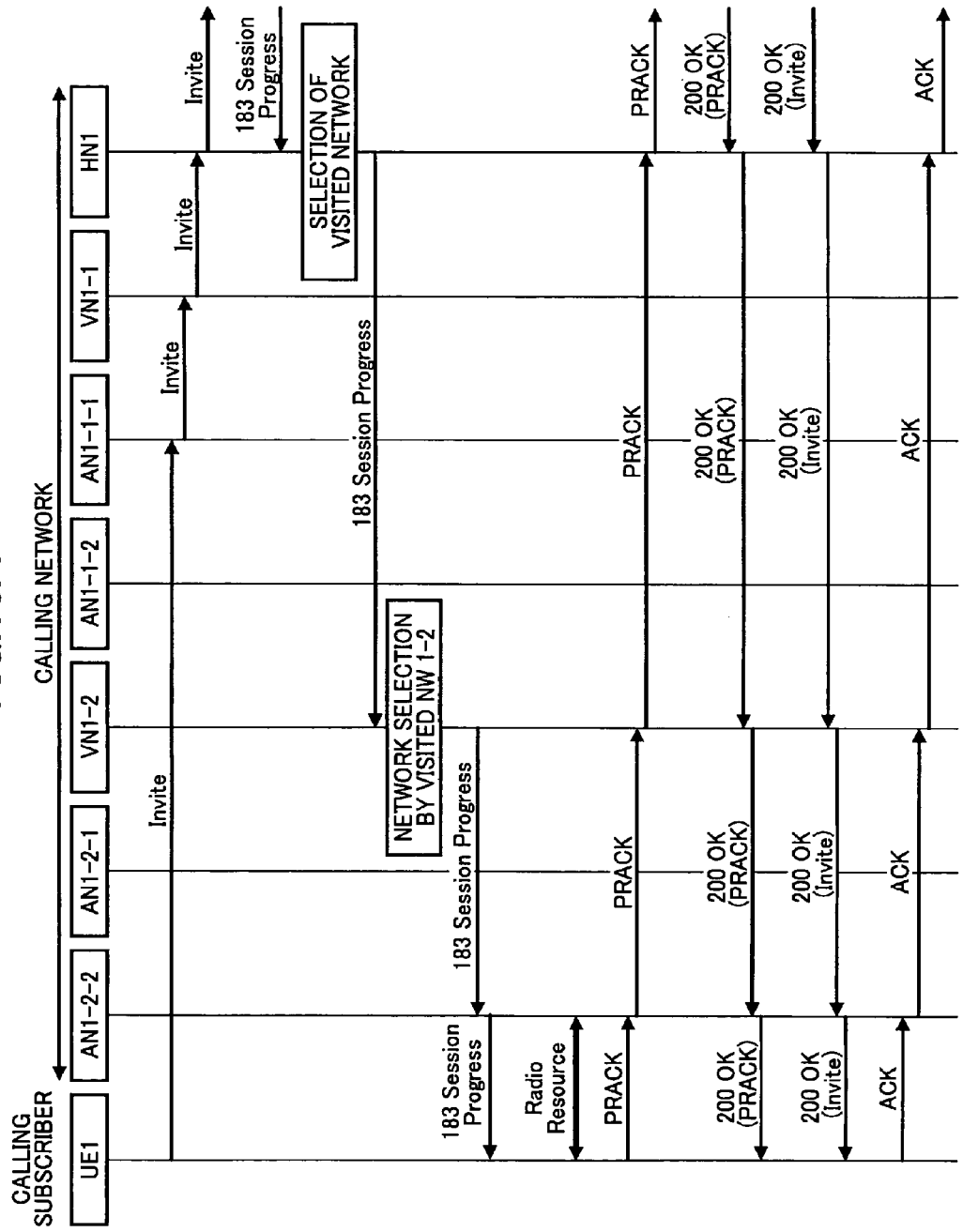
FIG. 18A show a calling-side sequence diagram in the case where a home network HN statically selects only a visited network VN and the visited network VN statically selects an access network AN.

FIG. 18A and FIG. 18B show an operational sequence at the start of communications in the case where a home network HN statically selects only a visited network VN and the visited network VN statically selects an access network AN. This sequence is similar to the sequence shown in FIG. 14A and FIG. 14B, but is different therefrom in that VN selected by HN selects AN upon receiving Invite or 183 Session Progress.

In this embodiment, AN is not dynamically selected. Accordingly, the procedure for creating a list of candidate ANs is unnecessary, so that it is possible to simplify a procedure.

In the above-described embodiments, it is assumed that both calling side and called side are mobile communications networks, but a correspondent may be a fixed network terminal or a server. Further, in the above-described embodiments, a description is given of the cases where SIP is used for a protocol. However, other protocols may also be used.

[Embodiment 10]

By the way, an operator provides services in various forms. In some cases, there may be an environment where a visited network VN of the operator has one or more of its subordinate access networks managed by a single management part and the visited network VN is capable of communicating directly with the management part but cannot directly distinguish the one or more of the access networks under the management part. For example, according to 3GPP, it is possible to accommodate different types of access networks (UTRAN and GERAN) under a common core network (GPRS). In this case, according to the conventional access network selection method, it is impossible to select subordinate UTRAN or GERAN connected to GPRS although it is possible to select GPRS itself, for GPRS is regarded as one access network. That is, since there is a specific mobility management function between one visited network VN and multiple access networks, these access networks are seen as one from the visited network VN, so that the visited network VN cannot directly select its subordinate access networks. The tenth embodiment of the present invention can cope with such a problem.

Figure 19:
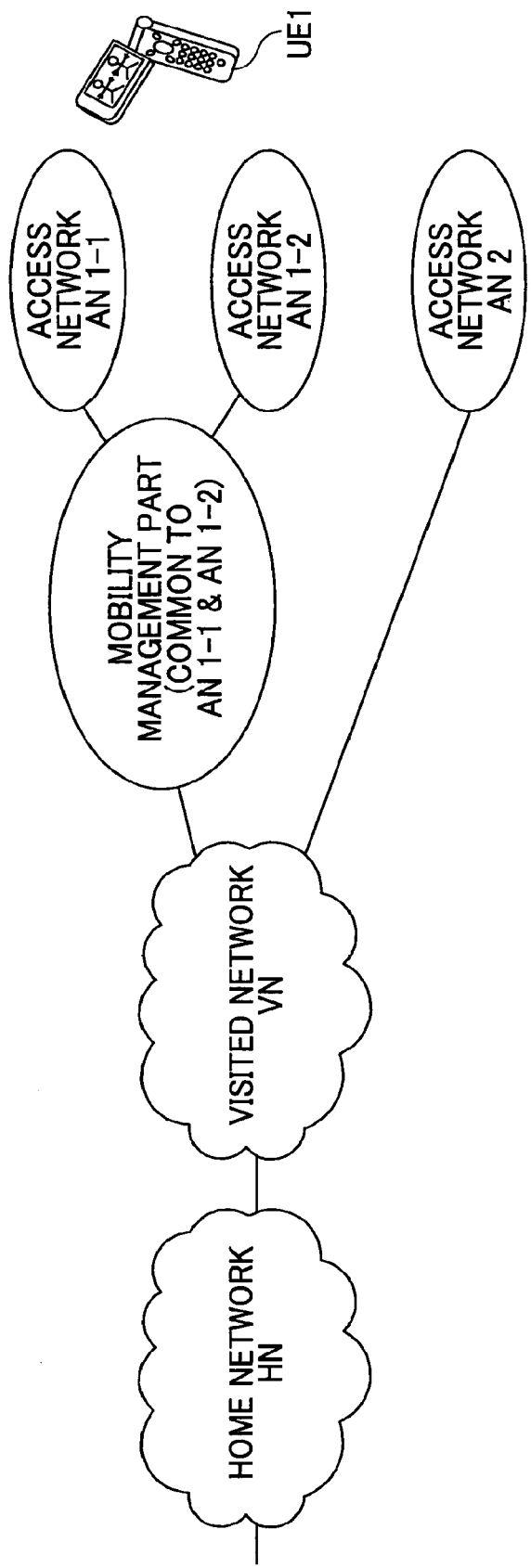
FIG. 19 shows a configuration diagram of a mobile communications network implementing the present invention in the case where there is the function of performing mobility management between a visited network VN and access networks ANs.

FIG. 19 shows a diagram of a network configuration where a specific mobility management function part (Mobility Management: MM) is provided between one visited network VN and multiple access networks. In this case, irrespective of which one of AN 1-1 and AN 1-2 UE1 is using, the visited network VN transmits user data to the Mobility Management (MM), and the Mobility Management transfers the data to AN that is being used by UE1.

Figure 20:
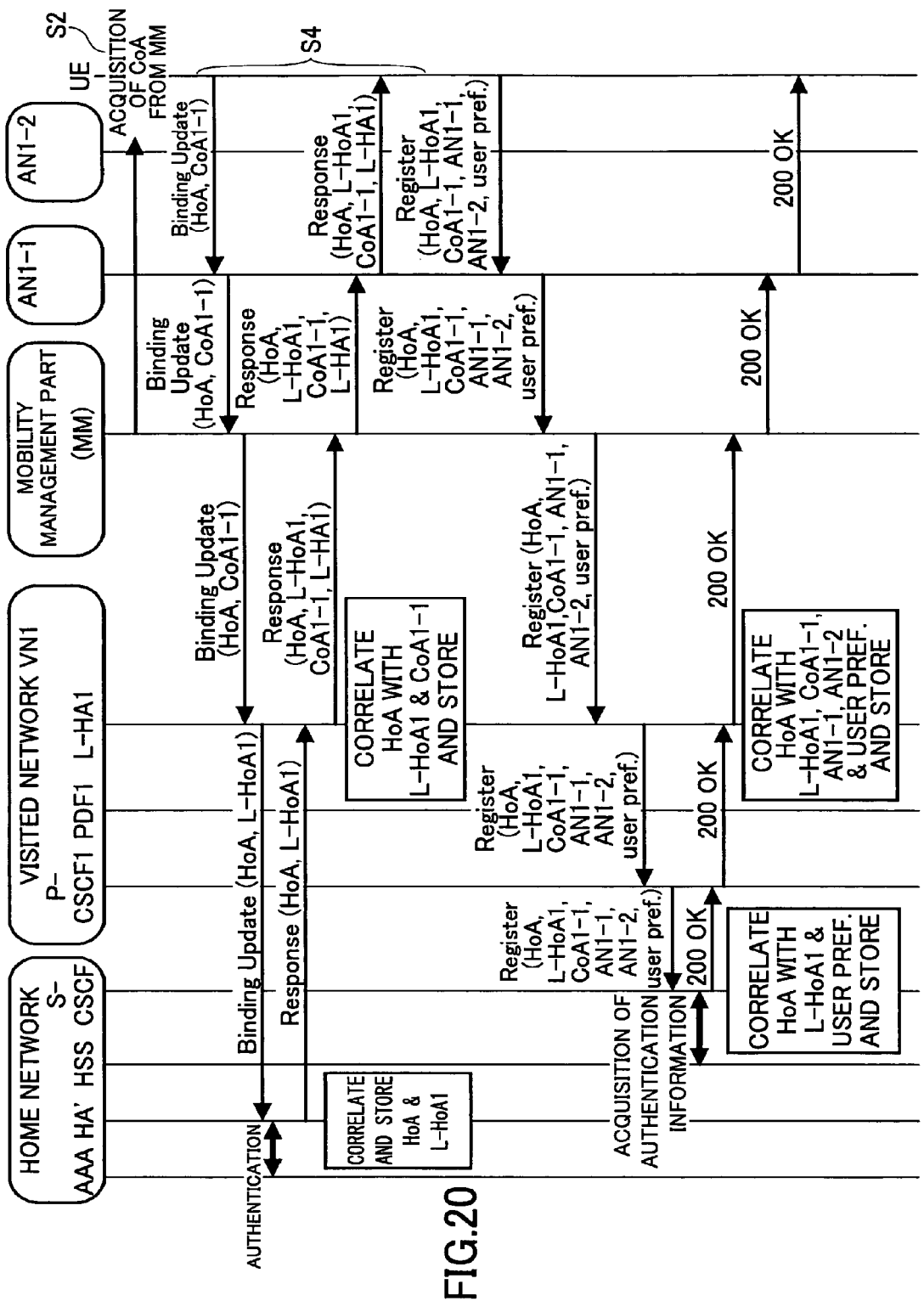
FIG. 20 is a diagram showing a location registration procedure.

FIG. 20 shows a procedure for acquisition of L-HoA and CoA and registration with S-CSCF by UE, taking the case of UE1 as an example. As graphically illustrated, when UE1 enters the service provision area of the visited network VN and receives the radio wave of AN 1-1 or AN 1-2, UE1 acquires CoA1-1 from MM via either AN (AN 1-1 in this embodiment) (S2). In FIG. 13A and FIG. 13B, the care-of addresses CoA1 and CoA2 are assigned to UE by AN 1-1 and AN 1-2 subordinate to the visited network VN, respectively, and are registered with the network via the respective access networks ANs. In this embodiment, the mobility management function part MM assigns the care-of address CoA1-1, but no such care-of address is assigned to an access network. That is, MM assigns (provides) CoA1-1 common to AN 1-1 and AN 1-2 to UE. Registration with the network from UE is performed through only one of ANs.

UE1 registers HoA1 assigned by a home network HN and CoA1-1 assigned by MM with L-HA1 via AN 1-1 (S4).

Upon receiving the registration from UE1, L-HA1 refers to a table that it retains, and determines whether L-HoA corresponding to HoA1 has been assigned. If L-HoA has not been assigned, L-HA1 assigns L-HoA1 to UE1, includes it in a response to the registration, and transmits it to UE1.

Upon completion of registration of the acquired CoA with L-HA1 and acquisition of L-HoA1, UE1 registers L-HoA1 with S-CSCF in the home network HN to which it subscribes (S6). Identifiers for AN identification AN 1-1 and AN 1-2 are added to the parameters of this registration from UE (Register).

By the above-described procedure, acquisition of L-HoA and CoA and registration with S-CSCF by UE are completed. Thereby, even when a network structure such as FIG. 19 is used, information distinguishing between all access networks available to UE is stored in the home network HN and the visited network VN. As a result, it is possible to appropriately select a combination of access networks suitable for the communications of UE1 and UE2 with the same procedure as the procedure described in each of the above-described embodiments.

As described above, a visited network VN is statically or dynamically selected by a home network HN. An access network AN may be statically or dynamically selected by the visited network VN or may be statically or dynamically selected by the home network HN. Static selection is preferred in terms of prompt determination of the access network AN and/or the visited network VN. Dynamic selection is preferred in terms of selecting an access network AN and/or a visited network VN that truly suits the communications conditions of a user. If the visited network VN does not wish to transmit information on its subordinate access network AN to the home network HN, it is preferable that the visited network VN select an access network AN. In terms of unifying management of the access network AN and the visited network VN, it is preferable that the home network HN select them.

Further, according to embodiments of the present invention, the following configurations may also be provided.

According to one embodiment of the present invention, there is provided an access network selection method in a communications network having multiple access networks, including the steps of: transmitting a signal of a call originating request from a calling-side terminal making the call originating request; notifying a device in a called-side network of an identifier corresponding to a currently available access network and a user preference from a called-side terminal having received the call originating request; making a list of candidates for an access network to be assigned to the called-side terminal in response to reception of the notification signal as a trigger, and transmitting the list from the device in the called-side network to the calling-side terminal; transmitting an acknowledgement signal responsive to a notification signal from the device in the called-side network, from the calling-side terminal; and determining the access network to be assigned to the called-side terminal in response to reception of the acknowledgement signal from the calling-side terminal as a trigger, and notifying the called-side terminal of the determined access network by the device in the called-side network (Configuration 1).

According to one embodiment of the present invention, there is provided an access network selection method in a communications network having multiple access networks, including the steps of: transmitting a signal of a call originating request from a calling-side terminal making the call originating request; notifying a device in a called-side network of an identifier corresponding to a currently available access network and a user preference from a called-side terminal having received the call originating request; making a list of candidates for an access network to be assigned to the called-side terminal based on a predetermined condition in response to reception of a notification signal from the called-side terminal as a trigger, and transmitting the list from the device in the called-side network to the calling-side terminal; further transmitting a response signal to the signal of the call originating request, from the called-side terminal; transmitting an acknowledgement signal responsive to the response signal from the called-side terminal, from the calling-side terminal; and determining the access network to be assigned to the called-side terminal based on a predetermined condition in response to reception of the acknowledgement signal, and notifying the called-side terminal of the determined access network by the device in the called-side network (Configuration 2).

According to one embodiment of the present invention, there is provided an access network selection method in a communications network having multiple access networks, including the steps of: detecting availability of an access network other than a currently used access network by a terminal in communication; notifying a device in the network of an identifier corresponding to the currently available access network, a user preference, and an access network selection request by the terminal having performed the detection; and determining an access network to be assigned to the terminal in response to reception of a notification signal from the terminal as a trigger, and notifying the terminal of the determined access network by the device in the network (Configuration 3).

According to one embodiment of the present invention, there is provided an access network selection method in a communications network having multiple access networks, including the steps of: detecting availability of an access network other than a currently used access network to a terminal in communication, and notifying the terminal of the availability by a device in the network; notifying the device in the network of an identifier corresponding to the currently available access network, a user preference, and an access network selection request from the terminal having received the notification signal; and determining an access network to be assigned to the terminal in response to reception of a notification signal from the terminal as a trigger, and notifying the terminal of the determined access network by the device in the network (Configuration 4).

Additionally, the access network selection method as set forth above in Configuration 3 or 4 may include the step of notifying a correspondent of the access network selection result (Configuration 5).

Additionally, in the access network selection method as set forth above in Configuration 5, a terminal having received the notification may select an access network (Configuration 6).

According to one embodiment of the present invention, there is provided an access network selection method in a communications network where multiple operators have respective networks and each of the networks includes multiple access networks, including the steps of: transmitting a signal of a call originating request including a service type to a called-side terminal by a calling-side terminal; selecting a visited network available to the called-side terminal among the networks managed by the different operators in accordance with the service type, including the selection result in the call originating request, and transmitting the call originating request to the called-side terminal by a home network of the called-side terminal having received the call originating request; notifying a device in the called-side visited network of an identifier of an available one or more of the access networks in the selected visited network and a user preference by the called-side terminal having received the call originating request; transmitting a list of candidates for an access network to be assigned to the called-side terminal to a device in a calling-side network by the device in the called-side visited network; selecting one of multiple visited networks available to the calling-side terminal in accordance with the service type and notifying the calling-side terminal of the selection result by a home network of the calling-side terminal having received the list; notifying a device in the calling-side visited network of an identifier of an available one or more of the access networks in the selected one of the visited networks and a user preference by the calling-side terminal having received the selection result; determining an access network to be assigned to the calling-side terminal and notifying a called-side network of the determined access network by the device in the calling-side visited network; determining the access network to be assigned to the called-side terminal and notifying the called-side terminal of the determined access network by the device in the called-side visited network; notifying the calling-side terminal of the access network assigned to the called-side terminal by one of the called-side terminal and the device in the called-side visited network; determining the access network to be assigned to the calling-side terminal and notifying the calling-side terminal of the determined access network by the device in the calling-side visited network; and notifying the called-side terminal of a type of the access network assigned to the calling-side terminal by one of the calling-side terminal and the device in the calling-side visited network (Configuration 7).

According to one embodiment of the present invention, there is provided an access network selection method in a communications network where multiple operators have respective networks and each of the networks includes multiple access networks, including the steps of: transmitting a signal of a call originating request including a service type to a called-side terminal by a calling-side terminal; transmitting the signal of the call originating request to the called-side terminal from multiple visited networks available to the called-side terminal among the networks managed by the different operators; notifying each of devices in the corresponding called-side visited networks of an identifier of an available one or more of the access networks with respect to each of the visited networks and a user preference by the called-side terminal having received the call originating request; transmitting a list of candidates for an access network to be assigned to the called-side terminal to a home network of the called-side terminal by each of the devices in the called-side visited networks; creating a list of multiple access networks available to the called-side terminal based on the lists and transmitting the list to a home network of the calling-side terminal by the home network of the called-side terminal; transmitting the list to the calling-side terminal through multiple visited networks available to the calling-side terminal by the home network of the calling-side terminal having received the list; notifying each of devices in the corresponding calling-side visited networks of an identifier of an available one or more of the access networks with respect to each of the visited networks and a user preference by the calling-side terminal having received the list; transmitting a list of candidates for an access network to be assigned to the calling-side terminal to the home network of the calling-side terminal by each of the devices in the calling-side visited networks; creating a list of multiple access networks available to the calling-side terminal based on the lists and transmitting the list to the home network of the called-side terminal by the home network of the calling-side terminal; selecting a visited network to be assigned to the called-side terminal and notifying the selected visited network of the selection by the home network of the called-side terminal; determining the access network to be assigned to the called-side terminal and notifying the called-side terminal of the determined access network by the device in the called-side visited network; notifying the calling-side terminal of the access network assigned to the called-side terminal by one of the called-side terminal and the device in the called-side visited network; selecting a visited network to be assigned to the calling-side terminal and notifying the selected visited network of the selection by the home network of the calling-side terminal; determining the access network to be assigned to the calling-side terminal and notifying the calling-side terminal of the determined access network by the device in the calling-side visited network; and notifying the called-side terminal of a type of the access network assigned to the calling-side terminal by one of the calling-side terminal and the device in the calling-side visited network (Configuration 8).

According to one embodiment of the present invention, there is provided an access network selection method in a communications network where multiple operators have respective networks and each of the networks includes multiple access networks, including the steps of: transmitting a signal of a call originating request including a service type to a called-side terminal by a calling-side terminal; selecting the network of one of the operators and one of the access networks thereof in accordance with the service type, including the selection result in the call originating request, and transmitting the call originating request to the called-side terminal by a home network of the called-side terminal having received the call originating request; transmitting a response signal to the calling-side terminal by the called-side terminal having received the call originating request; selecting the network of one of the operators and one of the access networks thereof in accordance with the service type and notifying the calling-side terminal of the selection result by a home network of the calling-side terminal having received the response signal; notifying the calling-side terminal of a type of the access network assigned to the called-side terminal by one of the called-side terminal and a device in a called-side network; and notifying the called-side terminal of a type of the access network assigned to the calling-side terminal by one of the calling-side terminal and a device in a calling-side network (Configuration 9).

According to one embodiment of the present invention, there is provided an access network selection method in a communications network where multiple operators have respective networks and each of the networks includes multiple access networks, including the steps of: transmitting a signal of a call originating request including a service type to a called-side terminal by a calling-side terminal; transmitting the signal of the call originating request to the called-side terminal through one or more visited networks available to the called-side terminal among the networks managed by the different operators by a home network of the called-side terminal having received the call originating request; notifying each of devices in the corresponding called-side visited networks of an identifier of an available one or more of the access networks with respect to each of the visited networks and a user preference by the called-side terminal having received the call originating request; transmitting a list of candidates for an access network to be assigned to the called-side terminal to the home network of the called-side terminal by each of the devices in the called-side visited networks; creating a list of multiple access networks available to the called-side terminal based on the lists and transmitting the list to a home network of the calling-side terminal by the home network of the called-side terminal; transmitting the list to the calling-side terminal through multiple visited networks available to the calling-side terminal by the home network of the calling-side terminal; notifying each of devices in the corresponding calling-side visited networks of an identifier of an available one or more of the access networks with respect to each of the visited networks and a user preference by the calling-side terminal; transmitting a list of candidates for an access network to be assigned to the calling-side terminal to the home network of the calling-side terminal by each of the devices in the calling-side visited networks; creating a list of multiple access networks available to the calling-side terminal based on the lists and transmitting the list to the home network of the called-side terminal by the home network of the calling-side terminal; selecting a visited network and the access network to be assigned to the called-side terminal and notifying the called-side terminal of the selected visited network and access network by the home network of the called-side terminal; notifying the calling-side terminal of the access network assigned to the called-side terminal by one of the called-side terminal and the device in the called-side visited network; selecting a visited network and the access network to be assigned to the calling-side terminal and notifying the calling-side terminal of the selected visited network and access network by the home network of the calling-side terminal; and notifying the called-side terminal of the access network assigned to the calling-side terminal by one of the calling-side terminal and the device in the calling-side visited network (Configuration 10).

According to one embodiment of the present invention, there is provided an access network selection method in a communications network where multiple operators have respective networks and each of the networks includes multiple access networks, including the steps of: transmitting a signal of a call originating request including a service type to a called-side terminal by a calling-side terminal; selecting one of the networks managed by the different operators as a visited network in accordance with the service type and notifying a device in the called-side visited network of the selection result by a home network of the called-side terminal having received the signal of the call originating request; selecting an access network in accordance with the service type, including the selection result in the call originating request, and transmitting the call originating request to the called-side terminal by the device in the called-side visited network; transmitting a response signal to the calling-side terminal by the called-side terminal having received the signal of the call originating request; selecting one of the networks managed by the different operators as a visited network in accordance with the service type and notifying a device in the calling-side visited network of the selection result by a home network of the calling-side terminal having received the response signal; selecting an access network in accordance with the service type and notifying the calling-side terminal of the selection result by the device in the calling-side visited network; notifying the calling-side terminal of a type of the access network assigned to the called-side terminal by one of the called-side terminal and the device in the called-side visited network; and notifying the called-side terminal of a type of the access network assigned to the calling-side terminal by one of the calling-side terminal and the device in the calling-side visited network (Configuration 11).

A description is given above of preferred embodiments of the present invention. However, the present invention is not limited to the specifically disclosed embodiments, and variations and modifications may be made without departing from the scope of the present invention. For convenience of description, the present invention is divided into several embodiments, of which a description has been given. However, the separation of the embodiments is not essential to the present invention, and one or more of the embodiments may be used as required.

What is claimed is:

1. An access network selection method in a communications network where multiple operators have respective networks and each of the networks includes multiple access networks, the access network selection method comprising:
    transmitting a signal of a call originating request including a service type to a called-side terminal by a calling-side terminal;
    selecting a visited network available to the called-side terminal among the networks managed by the different operators in accordance with the service type, including the selection result in the call originating request, and transmitting the call originating request to the called-side terminal by a home network of the called-side terminal having received the call originating request;
    notifying a device in the called-side visited network of an identifier of an available one or more of the access networks in the selected visited network and a user preference by the called-side terminal having received the call originating request;
    transmitting a list of candidates for an access network to be assigned to the called-side terminal to a device in a calling-side network by the device in the called-side visited network;
    selecting one of multiple visited networks available to the calling-side terminal in accordance with the service type and notifying the calling-side terminal of the selection result by a home network of the calling-side terminal having received the list;
    notifying a device in the calling-side visited network of an identifier of an available one or more of the access networks in the selected one of the visited networks and a user preference by the calling-side terminal having received the selection result;
    determining an access network to be assigned to the calling-side terminal and notifying a called-side network of the determined access network by the device in the calling-side visited network;
    determining the access network to be assigned to the called-side terminal and notifying the called-side terminal of the determined access network by the device in the called-side visited network;
    notifying the calling-side terminal of the access network assigned to the called-side terminal by one of the called-side terminal and the device in the called-side visited network;
    determining the access network to be assigned to the calling-side terminal and notifying the calling-side terminal of the determined access network by the device in the calling-side visited network; and
    notifying the called-side terminal of a type of the access network assigned to the calling-side terminal by one of the calling-side terminal and the device in the calling-side visited network.

2. The access network selection method as claimed in claim 1, wherein the access networks have identifiers serving as addresses for transferring user data in the access networks.

3. The access network selection method as claimed in claim 1, wherein the access networks have identifiers including information different from addresses for transferring user data in the access networks.

4. An access network selection method in a communications network where multiple operators have respective networks and each of the networks includes multiple access networks, the access network selection method comprising:
    transmitting a signal of a call originating request including a service type to a called-side terminal by a calling-side terminal;
    transmitting the signal of the call originating request to the called-side terminal from multiple visited networks available to the called-side terminal among the networks managed by the different operators by a home network of the called-side terminal having received the call originating request;
    notifying each of devices in the corresponding called-side visited networks of an identifier of an available one or more of the access networks with respect to each of the visited networks and a user preference by the called-side terminal having received the call originating request;
    transmitting a list of candidates for an access network to be assigned to the called-side terminal to a home network of the called-side terminal by each of the devices in the called-side visited networks;
    creating a list of multiple access networks available to the called-side terminal based on the lists and transmitting the list to a home network of the calling-side terminal by the home network of the called-side terminal;
    transmitting the list to the calling-side terminal through multiple visited networks available to the calling-side terminal by the home network of the calling-side terminal having received the list;
    notifying each of devices in the corresponding calling-side visited networks of an identifier of an available one or more of the access networks with respect to each of the visited networks and a user preference by the calling-side terminal having received the list;
    transmitting a list of candidates for an access network to be assigned to the calling-side terminal to the home network of the calling-side terminal by each of the devices in the calling-side visited networks;
    creating a list of multiple access networks available to the calling-side terminal based on the lists and transmitting the list to the home network of the called-side terminal by the home network of the calling-side terminal;
    selecting a visited network to be assigned to the called-side terminal and notifying the selected visited network of the selection by the home network of the called-side terminal;
    determining the access network to be assigned to the called-side terminal and notifying the called-side terminal of the determined access network by the device in the called-side visited network;
    notifying the calling-side terminal of the access network assigned to the called-side terminal by one of the called-side terminal and the device in the called-side visited network;
    selecting a visited network to be assigned to the calling-side terminal and notifying the selected visited network of the selection by the home network of the calling-side terminal;
    determining the access network to be assigned to the calling-side terminal and notifying the calling-side terminal of the determined access network by the device in the calling-side visited network; and
    notifying the called-side terminal of a type of the access network assigned to the calling-side terminal by one of the calling-side terminal and the device in the calling-side visited network.

5. An access network selection method in a communications network where multiple operators have respective networks and each of the networks includes multiple access networks, the access network selection method comprising:

transmitting a signal of a call originating request including a service type to a called-side terminal by a calling-side terminal;

transmitting the signal of the call originating request to the called-side terminal through one or more visited networks available to the called-side terminal among the networks managed by the different operators by a home network of the called-side terminal having received the call originating request;

notifying each of devices in the corresponding called-side visited networks of an identifier of an available one or more of the access networks with respect to each of the visited networks and a user preference by the called-side terminal having received the call originating request;

transmitting a list of candidates for an access network to be assigned to the called-side terminal to the home network of the called-side terminal by each of the devices in the called-side visited networks;

creating a list of multiple access networks available to the called-side terminal based on the lists and transmitting the list to a home network of the calling-side terminal by the home network of the called-side terminal;

transmitting the list to the calling-side terminal through multiple visited networks available to the calling-side terminal by the home network of the calling-side terminal;

notifying each of devices in the corresponding calling-side visited networks of an identifier of an available one or more of the access networks with respect to each of the visited networks and a user preference by the calling-side terminal;

transmitting a list of candidates for an access network to be assigned to the calling-side terminal to the home network of the calling-side terminal by each of the devices in the calling-side visited networks;

creating a list of multiple access networks available to the calling-side terminal based on the lists and transmitting the list to the home network of the called-side terminal by the home network of the calling-side terminal;

selecting a visited network and the access network to be assigned to the called-side terminal and notifying the called-side terminal of the selected visited network and access network by the home network of the called-side terminal;

notifying the calling-side terminal of the access network assigned to the called-side terminal by one of the called-side terminal and the device in the called-side visited network;

selecting a visited network and the access network to be assigned to the calling-side terminal and notifying the calling-side terminal of the selected visited network and access network by the home network of the calling-side terminal; and notifying the called-side terminal of the access network assigned to the calling-side terminal by one of the calling-side terminal and the device in the calling-side visited network.

* * * * *